(12) United States Patent
Picton

(10) Patent No.: US 8,606,413 B2
(45) Date of Patent: Dec. 10, 2013

(54) WATER MANAGEMENT SYSTEM

(76) Inventor: David John Picton, Auckland (NZ)

( * ) Notice: Subject to any disclaimer, the term of this patent is extended or adjusted under 35 U.S.C. 154(b) by 232 days.

(21) Appl. No.: 13/121,836

(22) PCT Filed: Sep. 29, 2009

(86) PCT No.: PCT/NZ2009/000204
§ 371 (c)(1),
(2), (4) Date: Mar. 30, 2011

(87) PCT Pub. No.: WO2010/039045
PCT Pub. Date: Apr. 8, 2010

(65) Prior Publication Data
US 2011/0178644 A1 Jul. 21, 2011

(30) Foreign Application Priority Data
Sep. 30, 2008 (NZ) .................................. 571668

(51) Int. Cl.
*G05D 7/06* (2006.01)
*G05D 16/20* (2006.01)

(52) U.S. Cl.
USPC ............................................ 700/282; 702/50

(58) Field of Classification Search
USPC ............. 700/275, 281, 282; 73/1.17, 40, 592; 702/50, 51; 137/15.11
See application file for complete search history.

(56) References Cited

U.S. PATENT DOCUMENTS

| | | | |
|---|---|---|---|
| 2,054,346 A | 9/1936 | Van Sittert | |
| 3,180,362 A | 4/1965 | Muller | |
| 3,719,239 A | 3/1973 | Richter, Jr. et al. | |
| 5,004,014 A | 4/1991 | Bender | |
| 5,161,563 A | 11/1992 | Thompson | |
| 5,287,884 A | 2/1994 | Cohen | |
| 5,441,070 A * | 8/1995 | Thompson | 137/1 |
| 5,475,614 A | 12/1995 | Tofte et al. | |
| 5,503,175 A | 4/1996 | Ravilious et al. | |
| 5,568,825 A | 10/1996 | Faulk | |
| 5,708,195 A | 1/1998 | Kurisu et al. | |
| 5,764,148 A * | 6/1998 | Frasier | 340/626 |
| 5,782,263 A * | 7/1998 | Isaacson et al. | 137/487.5 |
| 5,893,388 A | 4/1999 | Luker | |
| 5,941,307 A | 8/1999 | Tubel | |

(Continued)

FOREIGN PATENT DOCUMENTS

| | | |
|---|---|---|
| EP | 1106904 | 6/2001 |
| FR | 2853390 | 10/2004 |

(Continued)

OTHER PUBLICATIONS

International Search Report, PCT/NZ2009/000204, Feb. 22, 2010.

*Primary Examiner* — Charles Kasenge
(74) *Attorney, Agent, or Firm* — Young & Thompson

(57) ABSTRACT

A method of managing and conserving water at a point of use, by installing a control panel and at least one electrically operated valve in a plumbing line, which valve can monitor at least pressure and flow rate, and allow the calculation of the total volume of flow in a particular line. The valve being controlled by a controller programmed to prevent water loss by monitoring the pressure and flow rate in a particular line to detect and prevent water consumption outside controlled parameters by shutting off the valve if the system detects an uncontrolled flow, such as faucet being left on, or a leaky toilet cistern, or the water flow in a zone exceeding a predetermined quota.

20 Claims, 28 Drawing Sheets

(56) References Cited

U.S. PATENT DOCUMENTS

| | | |
|---|---|---|
| 5,971,011 A | 10/1999 | Price |
| 5,979,493 A * | 11/1999 | Simpkins, Jr. ............. 137/487.5 |
| 6,105,607 A | 8/2000 | Caise et al. |
| 6,119,720 A * | 9/2000 | Isaacson et al. ............. 137/459 |
| 6,199,584 B1 * | 3/2001 | Brown et al. ............. 137/519.5 |
| 6,209,576 B1 | 4/2001 | Davis |
| 6,216,727 B1 * | 4/2001 | Genova et al. ............. 137/487.5 |
| 6,302,129 B1 | 10/2001 | Van Dewerker |
| 6,317,051 B1 | 11/2001 | Cohen |
| 6,374,846 B1 | 4/2002 | Desmet |
| 6,467,694 B1 * | 10/2002 | Jerome ....................... 236/44 B |
| 6,520,003 B1 | 2/2003 | Fox |
| 6,543,479 B2 | 4/2003 | Coffey et al. |
| 6,549,816 B2 | 4/2003 | Gauthier et al. |
| 6,691,724 B2 * | 2/2004 | Ford ................................. 137/1 |
| 6,769,443 B2 | 8/2004 | Bush |
| 6,914,531 B1 * | 7/2005 | Young ........................... 340/606 |
| 6,945,274 B1 | 9/2005 | Davis |
| 6,962,162 B2 | 11/2005 | Acker |
| 6,987,458 B1 | 1/2006 | Limmer |
| 7,032,435 B2 * | 4/2006 | Hassenflug ...................... 73/46 |
| 7,114,516 B2 | 10/2006 | Ito |
| 7,174,771 B2 | 2/2007 | Cooper |
| 7,201,180 B2 * | 4/2007 | Ephrat et al. .................... 137/14 |
| 7,228,726 B2 * | 6/2007 | Kates ................................ 73/40 |
| 7,306,008 B2 | 12/2007 | Tornay |
| 2002/0148515 A1 | 10/2002 | Coffey et al. |
| 2004/0128034 A1 * | 7/2004 | Lenker et al. ................. 700/282 |
| 2004/0163705 A1 * | 8/2004 | Uhler ............................... 137/79 |
| 2004/0206405 A1 | 10/2004 | Smith et al. |
| 2005/0067049 A1 * | 3/2005 | Fima ............................. 141/192 |
| 2005/0224118 A1 * | 10/2005 | Tornay .................... 137/624.11 |
| 2005/0235306 A1 | 10/2005 | Fima |
| 2006/0260691 A1 * | 11/2006 | Davidoff .................... 137/487.5 |
| 2007/0289635 A1 * | 12/2007 | Ghazarian et al. ............ 137/312 |
| 2009/0235992 A1 * | 9/2009 | Armstrong ................. 137/487.5 |

FOREIGN PATENT DOCUMENTS

| | | |
|---|---|---|
| GB | 2319634 | 5/1998 |
| GB | 2360365 | 9/2001 |
| GB | 2377311 | 1/2003 |
| JP | 2002-030702 | 1/2002 |
| WO | WO 95/13497 | 5/1995 |
| WO | WO 03/057998 | 7/2003 |
| WO | WO 2006/014891 | 2/2006 |
| WO | WO 2008/090359 | 7/2008 |

* cited by examiner

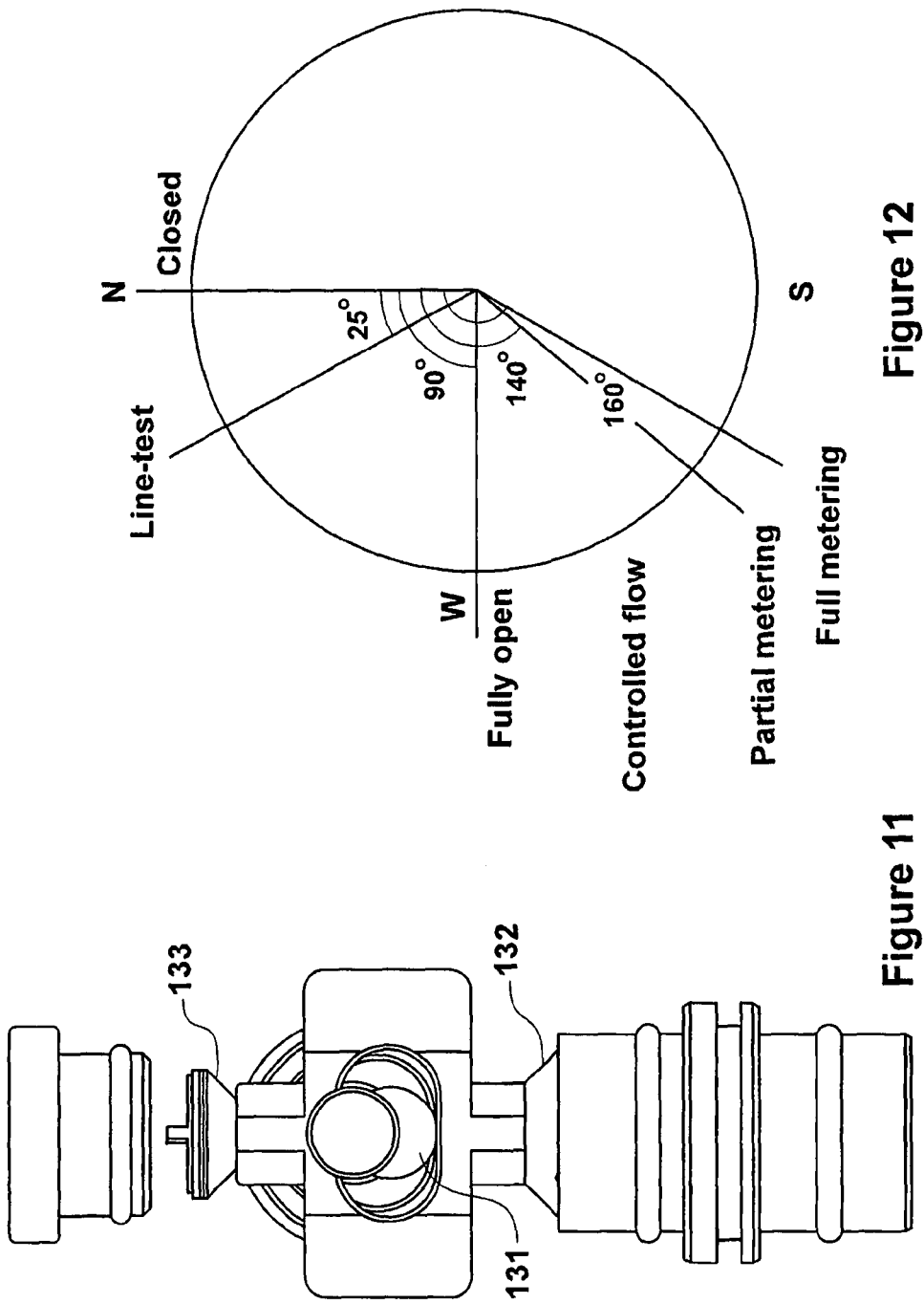

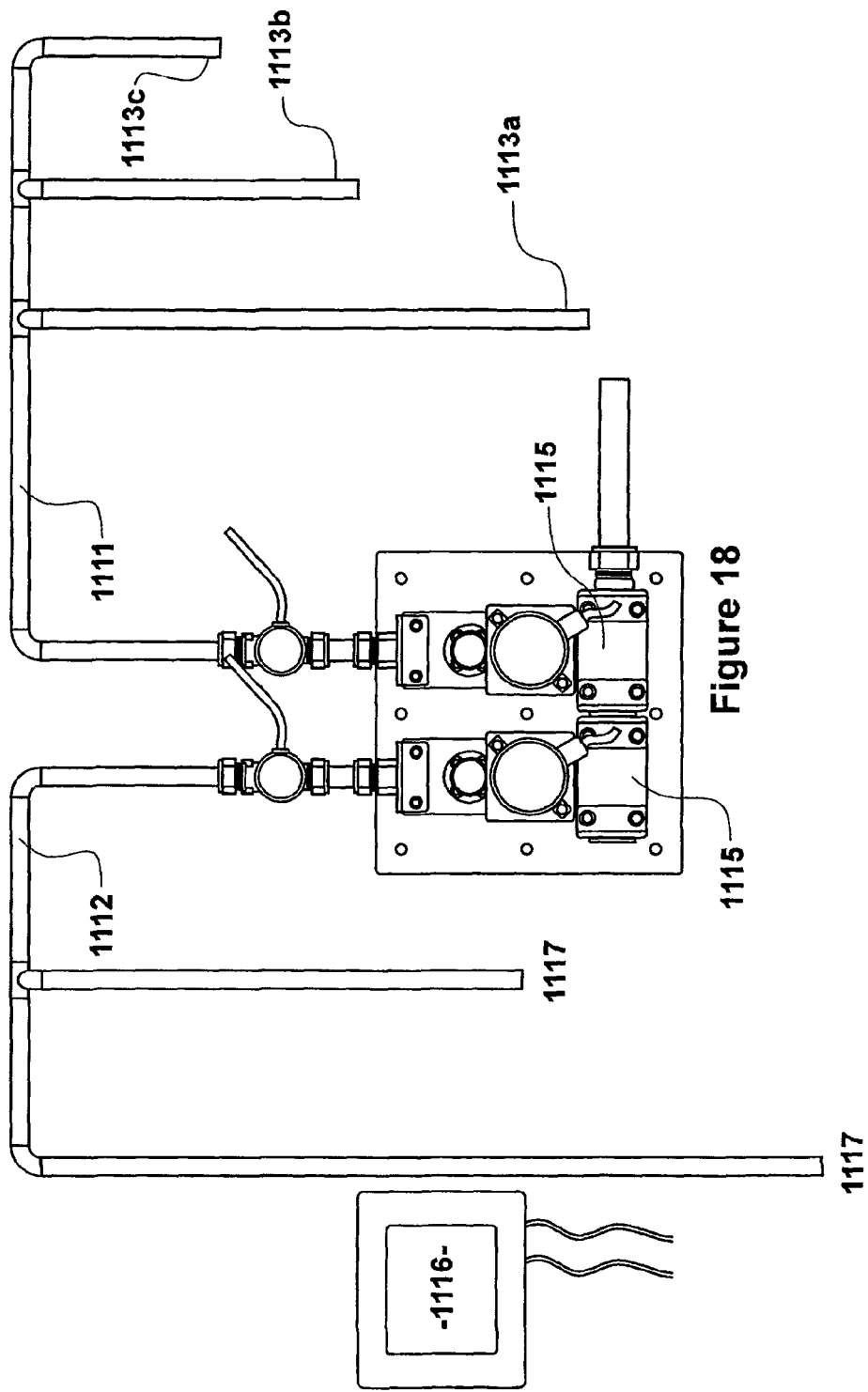

WATER MANAGEMENT SYSTEM

FIELD OF THE INVENTION

This invention relates to a water management system at the point of use, for example the monitoring and/or management of water consumption in or around buildings such as residential homes, apartment buildings, hotels, motels, office buildings, schools, factories, and the management and conservation of water supplies and controlled water usage.

RELATED APPLICATIONS

The water management system in this invention makes use of a valve which is described separately in my New Zealand patent application number 571667 filed 30 Sep. 2008, and the New Zealand complete after provisional specification and the PCT application for the valve which are being filed contemporaneously with this application. Contents of the provisional and complete after provisional and PCT specifications on the valve are incorporated herein by way of reference.

BACKGROUND OF THE INVENTION

Water is a scarce and valuable resource on a global scale. Town water supplies may provide some form of metering of the consumption by for examples a household, hotel, office, or apartment building by providing water meter on the property measuring the quantity of water consumed by a household over a given period. However the meters do not provide any significant information enabling the user to control the use of water in different rooms, or at different outlets, or different appliances, as such meters provide only a bulk measurement which is used for costing purposes. Such water meters do not distinguish between a dripping tap in a basin, the consumption of water for drinking purposes, or for use in washing machines or other appliances, or in fact the consumption or loss of water through leaks in the pipe work between the gate and the household.

Much water is lost through forgetfulness (for example leaving the faucet on unattended), from leaky taps, burst or leaky pipes, and in innumerable ways, from the use of high volume showers, or for example in leaving faucets or showers in the ON position to flush water through the pipes until the outlet reaches the required temperature, or through appliances that do not seal properly and leak water to waste without the householder knowing that the appliances is defective.

There is a need to provide more effective information on water use, and water management enabling householders to minimise unnecessary water usage, and to control their own consumption by knowing which appliances or which users consume too much, or at which times of the day there is excessive water consumption, as information is power, and the right information can enable users to control their water usage in a more cost effective way.

PRIOR ART

The following patent specifications deal with the control of plumbing systems, particularly in residential dwellings, and more particularly focused on leak detection.

U.S. Pat. No. 6,962,162 by Larry K. Acker entitled "Method for operating a multi family/commercial plumbing system"
U.S. Pat. No. 6,769,443
U.S. Pat. No. 6,549,816
U.S. Pat. No. 7,306,008
U.S. Pat. No. 7,174,771
U.S. Pat. No. 7,114,516

None of these documents provide a comprehensive system for the management and conservation of water usage within a building.

SUMMARY OF THE INVENTION

It is an object of this invention to provide an improved water management system, or one which will at least provide the public with a useful choice.

In one aspect the invention provides a water management system adapted for use with a supply line from a water source to a point of use, the system comprising: at least one electrically operated valve located in the supply line; each said valve having a water inlet and a water outlet to a zone controlled by that valve, said zone having one or more points of use, each said valve capable of allowing a number of different flow rates from a fully shut off position to fully open position including also a sensing position with a minimal flow rate; each valve having a pressure sensor located in the valve or downstream of the valve outlet to detect pressure of the water in the zone supplied by the valve; each valve having a flow sensor located in the valve or downstream of the valve outlet to measure the flow rate of water flowing in the zone supplied by the valve; a controller interfaced to the or each pressure sensor, the or each flow sensor and the or each electrically operated water valve, the controller being operative to terminate or change the flow of water to a zone or point of use in the event that (a) the flow rate exceeds a maximum allowed value, or (b) the total flow exceeds a maximum allowed quota, or (c) a pressure change is detected in the line.

Preferably the controller has a display screen and user operated controls to enable the user to monitor water usage and/or to change the usage parameters.

Preferably the valve includes a shut off valve and a metering valve.

Preferably the shut off valve and the metering valve are controlled by the rotational position of an electric motor.

Preferably the controller is programmed to control the valve to allow a soft start in which the valve is gradually opened to allow an initial water flow less than the demand flow at the point of use.

Preferably the controller records water usage per zone and reports usage and any faults on its display screen.

Preferably the controller reports water usage and any faults to a remote site.

In another aspect the invention provides a plumbing installation including a water inlet connected or connectable to a mains water supply, an adjustable valve connected between the water inlet, and a water feed pipe leading to different outlets such as taps, showers, toilets, appliances and the like, the water feed pipe being connected to a number of branches, servicing one or more of the outlets, wherein a pressure sensor and a flow sensor are connected to the adjustable valve or to the water feed pipe (or any of the branches thereof) to sense the pressure and/or water flow and/or volume consumed within the water feed pipe, and wherein a controller having a display and input means, is operatively connected to the adjustable valve to control the operation of the valve in response to signals from the pressure sensor and/or the flow sensor, and in response to programmes controlling the pressure or flow within the water feed pipe or branches thereof.

Preferably the controller has a number of preset programmes capable of operating self tests on the plumbing installation, at least one of which programmes can detect if a tap or faucet has been left in the open position and if so can close the adjustable valve to prevent wastage of water.

Preferably one of which programmes can detect a leak at one or more points within the water feed pipe and/or branches thereof.

In summary the invention provides a method of managing and conserving water at a point of use. It achieves this objective by installing a controller (preferably a microprocessor) having a display so that the user can view their day to day water consumption and be notified of any faults especially leaks detected in the plumbing installation. The controller is linked to and receives inputs from at least one electrically operated valve installed in the water between the water supply and the points of use. The valve preferably incorporates sensors so that it can monitor pressure and flow rate, and hence allow the calculation of the total volume of water used in a particular line over time. The valve is controlled by the controller programmed to prevent water loss by monitoring the pressure and flow rate in a particular line to detect and prevent water consumption outside controlled parameters by shutting off the valve if the system detects an uncontrolled flow, such as faucet being left on, or a leaky toilet cistern, or the water flow in a zone exceeding a predetermined quota.

In a similar aspect the invention provides a plumbing installation including a water inlet connected or connectable to a mains water supply, an adjustable valve connected between the water inlet, and a water feed pipe leading to different outlets such as taps, showers, toilets, appliances and the like, the water feed pipe being connected to a number of branches, servicing one or more of the outlets, wherein a pressure sensor and a flow sensor are connected to the adjustable valve or to the water feed pipe (or any of the branches thereof) to sense the pressure and/or water flow and/or volume consumed within the water feed pipe, and wherein a controller having a display and input means, is operatively connected to the adjustable valve to control the operation of the valve in response to signals from the pressure sensor and/or the flow sensor, and in response to programmes controlling the pressure or flow within the water feed pipe or branches thereof.

Preferably the plumbing installation includes a controller having a number of preset programmes capable of operating self tests on the plumbing installation, at least one of which programmes includes the ability to detect leaks at one or more points within the water feed pipe and/or branches thereof.

Preferably the controller has a display to display the results of these programme tests, and has means for inputting data. The means for inputting data may be a keyboard, number pad or the like although it is preferable that it is a touch screen, enabling the user to select from a number of options displayed on the screen.

In another aspect the invention provides a water management system having a controller capable of controlling a valve situated between a water inlet (typically connected to a mains water supply but it could be connected a water tank, underground bore, or any other supply of bulk water) the valve being connected to a first zone feed pipe, the first zone feed pipe having a number of branches each branch leading to one or more outlets, the controller capable of receiving signals from pressure and flow sensors associated with the first zone feed pipe, the controller having a number of preset functions allowing the valve to be set in different conditions to control the pressure and flow of water within the first zone feed pipe to enable the controller to detect leaks or to control water usage.

In the third aspect the invention provides a method of managing and conserving water in a dwelling by monitoring the pressure in water pipes within the dwelling, or monitoring the pressure of the water pipe supplying a particular zone or collection of pipes in a dwelling, and using the change in pressure to detect leaks, and where appropriate using this information to automatically shut off the water supply to a particular water pipe or zone or collection of water pipes.

In another aspect the invention provides a method of managing and conserving water in a dwelling by installing water management system as described above, to run programmes which check the water usage and if a leak is detected will shut off the valve to prevent flow of water to a zone feed pipe where a leak has been detected.

The method may also include a number of different controls which will be explained in more detail in the description of the preferred embodiments, but examples include:

Allocating a certain volume of water to a user for a shower, bath or the like, so that once the total volume of water has been supplied, the water flowing in that particular zone feed pipe or branch can be shutoff; or The controller can be programmed to shut off water flow completely when the house is vacated, or the controller, can be programmed to maintain flow and pressure in certain zone feed pipes at certain times, for example if one elects to have a shower at 7:00 am the zone feed pipe leading to the shower outlet can be programmed to have priority over other outlets so that a washing machine or dishwasher will receive a reduced pressure or reduced flow rate instead of interrupting a shower and/or changing the mix of hot and cold water as the pressure fluctuates within the zone feed pipes leading to the shower.

The number of permutations, available from the method and water management system of this invention are many and varied, and some of these will be described in detail in the preferred embodiment.

In another aspect, the provides a method of controlling water flow in a particular zone feed pipe by sending an identifiable pressure signal from the tap or hose nozzle at the outlet which can be detected by the pressure sensor associated with that zone feed pipe, and the pressure variation can then be used to signal to the controller to change the water flow or water pressure in that zone feed pipe. This feature is best understood by a description of a particular example, and will become apparent from a study of the graphs of pressure and flow rate.

BRIEF DESCRIPTION OF THE DRAWING FIGURES

These and other aspects, which should be considered in all its novel aspects, will become apparent from the following description, which will be given by way of example only with reference to the accompanying drawings, in which.

Figure 6:
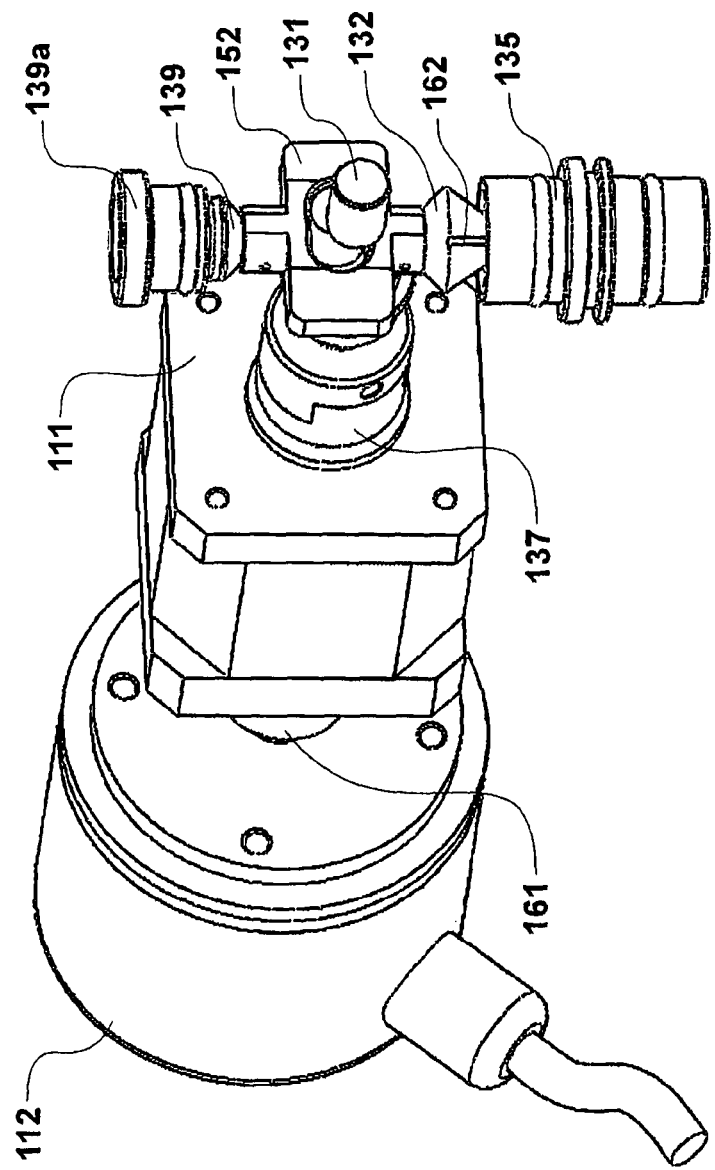

FIG. 6 it is a partly cut away view illustrating the interior of the valve body to illustrate the shape of the metering valve and its telltale groove, and its relative location to the crank pin, and the shut-off valve.

FIGS. 7-11 show cross sectional views through the centre of the valve body and the crank pin showing the crank pin in different positions as it rotates within its keeper, and showing the shut-off valve and the metering valve in different control positions. These different positions will be apparent from the table of valve settings as that will correlate the position of the crank pin with the different flow rates.

Figure 7:
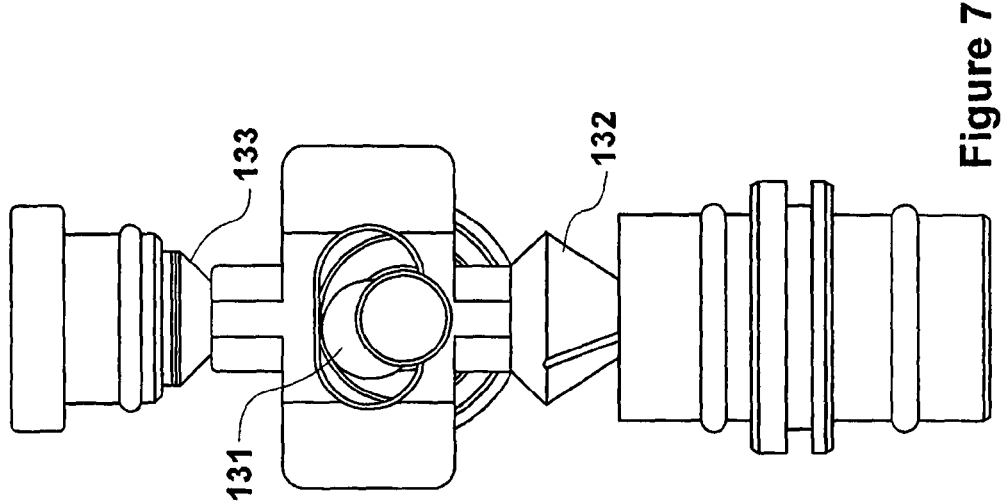

FIG. 7 shows the crank pin in the top dead centre position with the metering valve fully open end of the shut-off valve fully closed.

Figure 8:
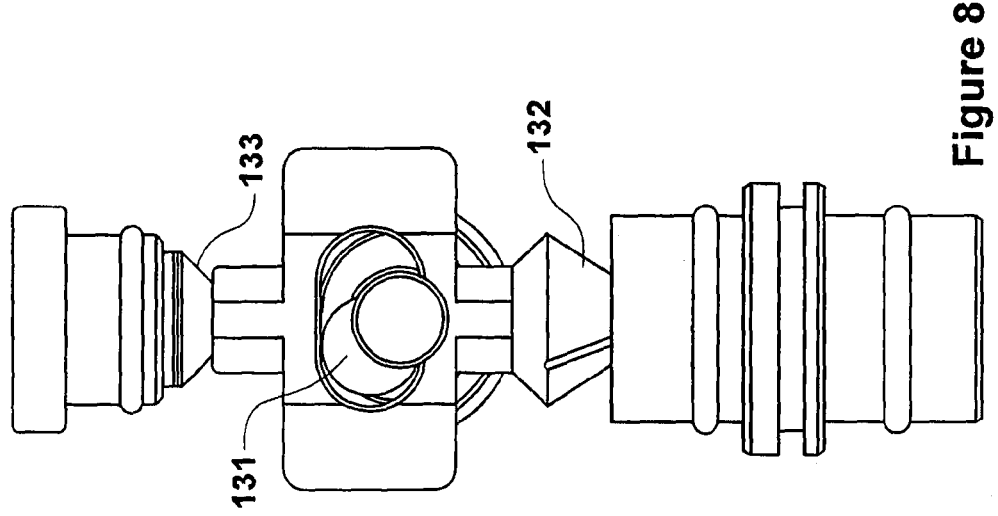

FIG. 8 shows the crank pin rotated to the north-west position (the crank is the circle to the left of the shaft).

Figure 9:
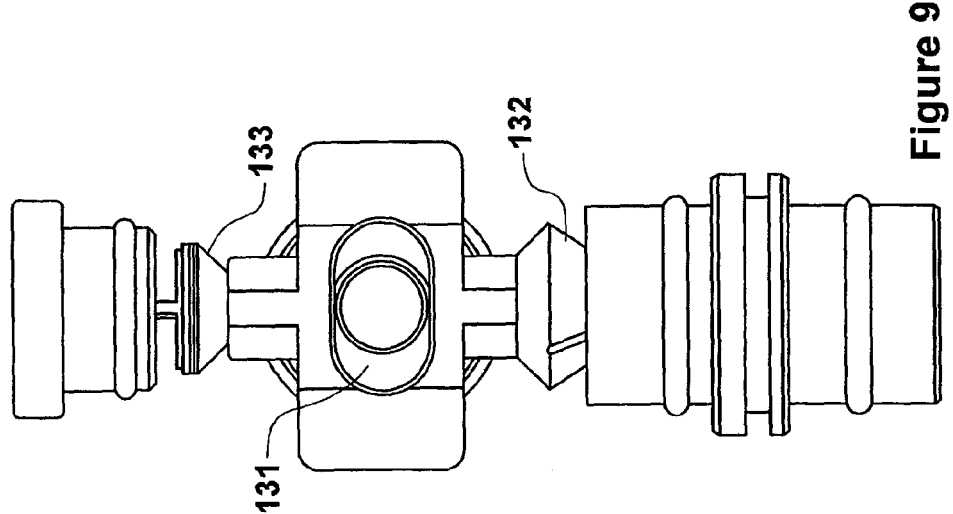

FIG. 9 shows the crank pin in the Westerly position.

Figure 10:
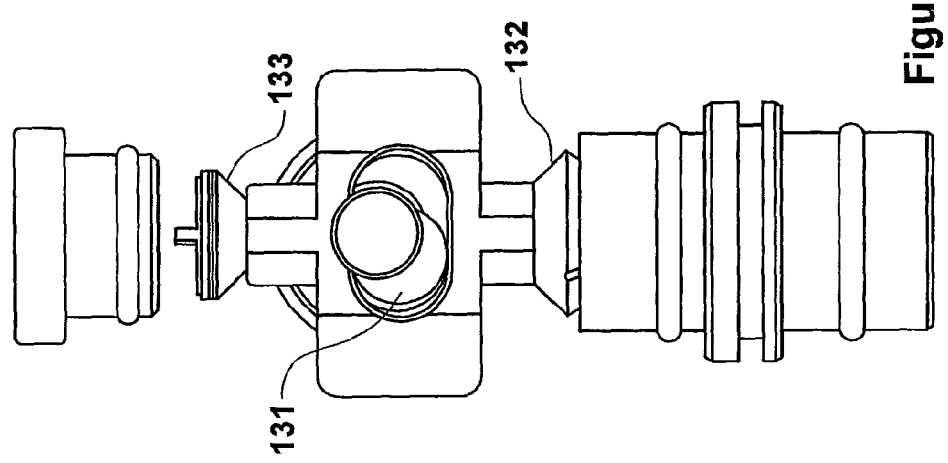

FIG. 10 shows the crank pin in the southwest position.

FIG. 11 shows the crank pin in the southern position.

FIG. 12 illustrates the crank pin positions controlled by the stepper motor.

Figure 13:
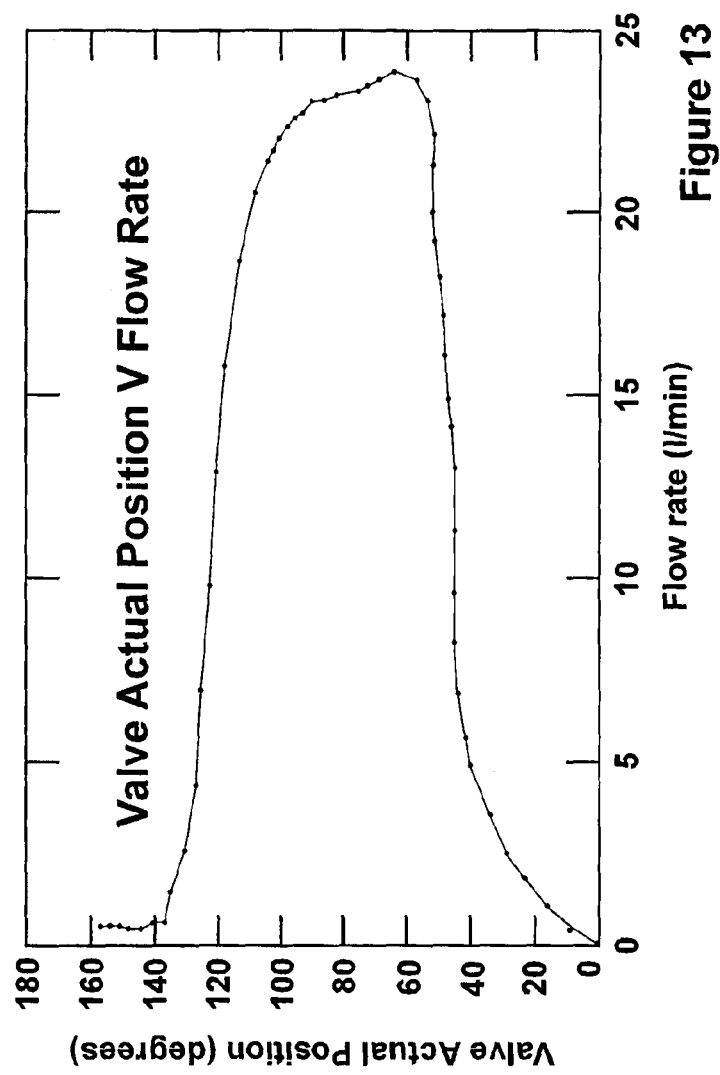

FIG. 13 is a graph showing the relationship of valve position (from FIG. 12) to flow rate.

Figure 14:
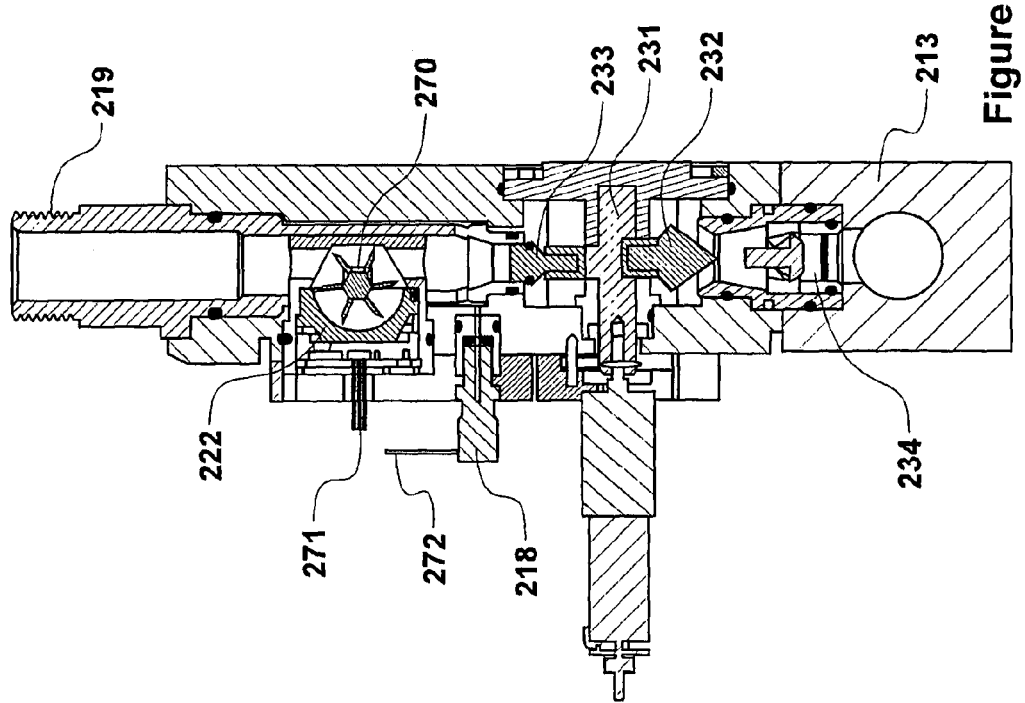

FIG. 14 is a cross sectional view through the valve of Example 2, showing the relationship of the crank pin to the various components within the valve body.

Figure 15:
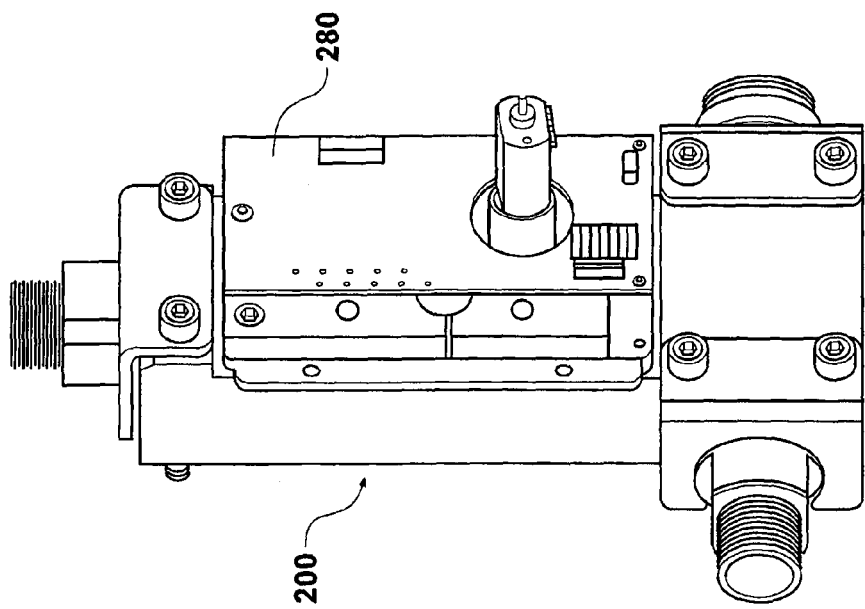

FIG. 15 is a front perspective view of the valve body of Example 2, showing the location of the printed circuit board, but with the electric motor omitted.

Figure 16:
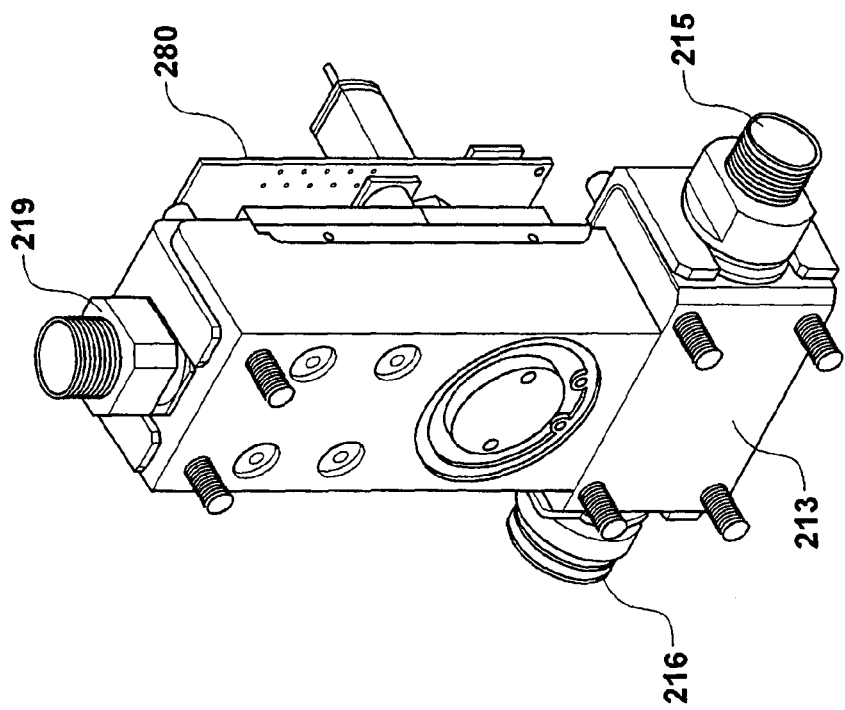

FIG. 16 is a rear perspective view of the valve body of FIG. 15.

Figure 17:
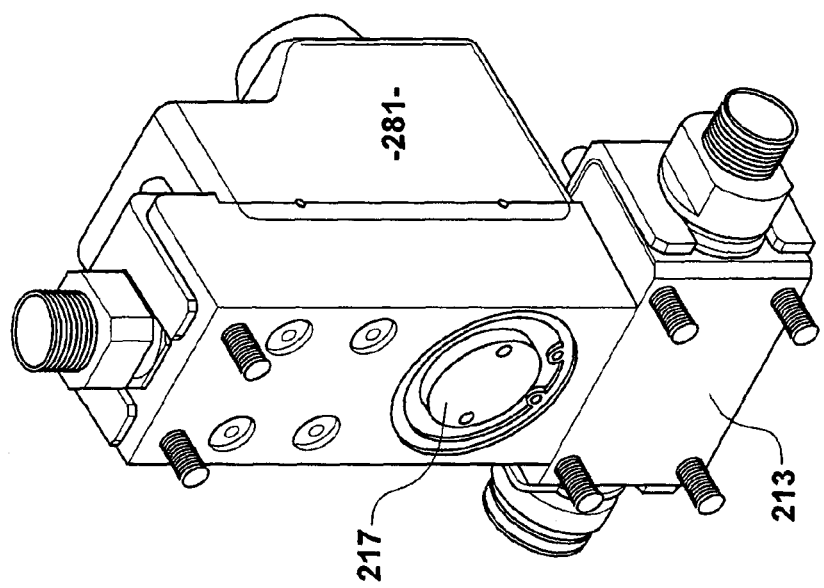

FIG. 17 is a rear perspective view of the assembled valve of FIG. 16 but including the housing for the electric motor and gear box.

FIG. 18 illustrates a schematic view of a partial plumbing installation having a main inlet pipe connected to a pair of valves each of which valves controls the water supply to its own zone feed pipe.

Figure 19:
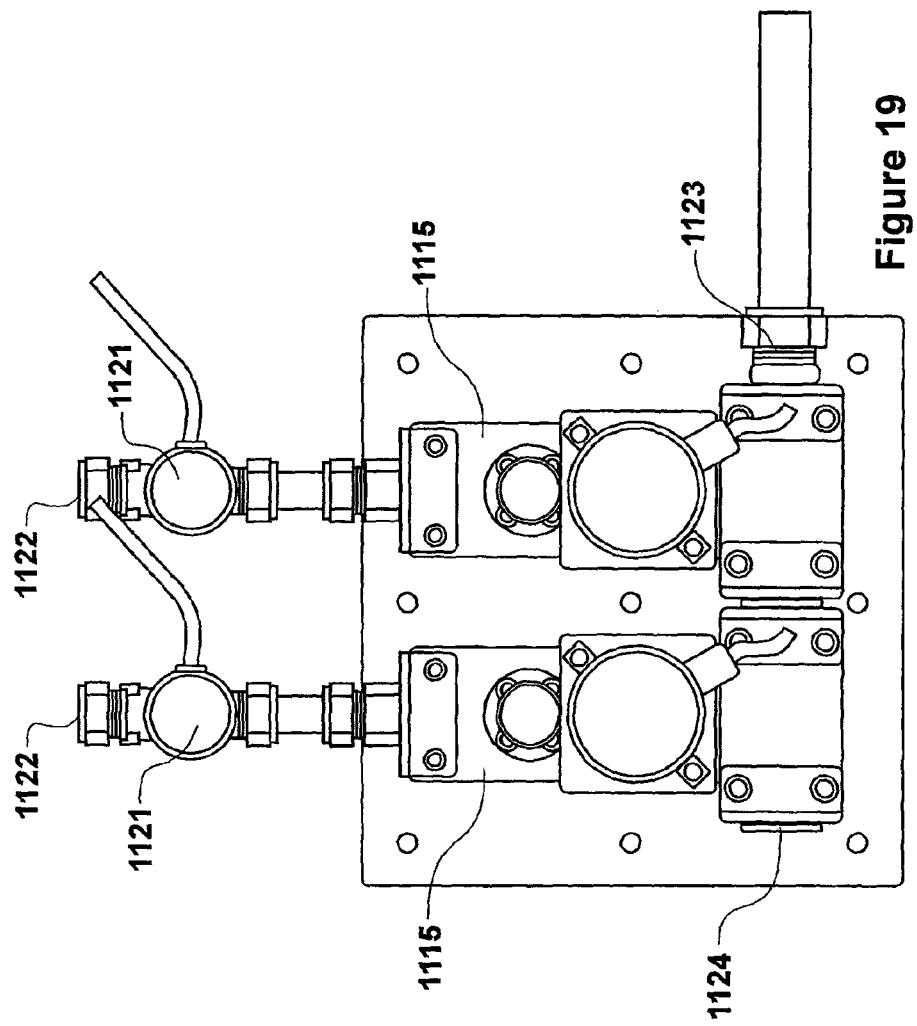

FIG. 19 is an expanded view of the electrically controlled valves, and the pressure and flow sensors on the outlet of each valve.

Figure 20:
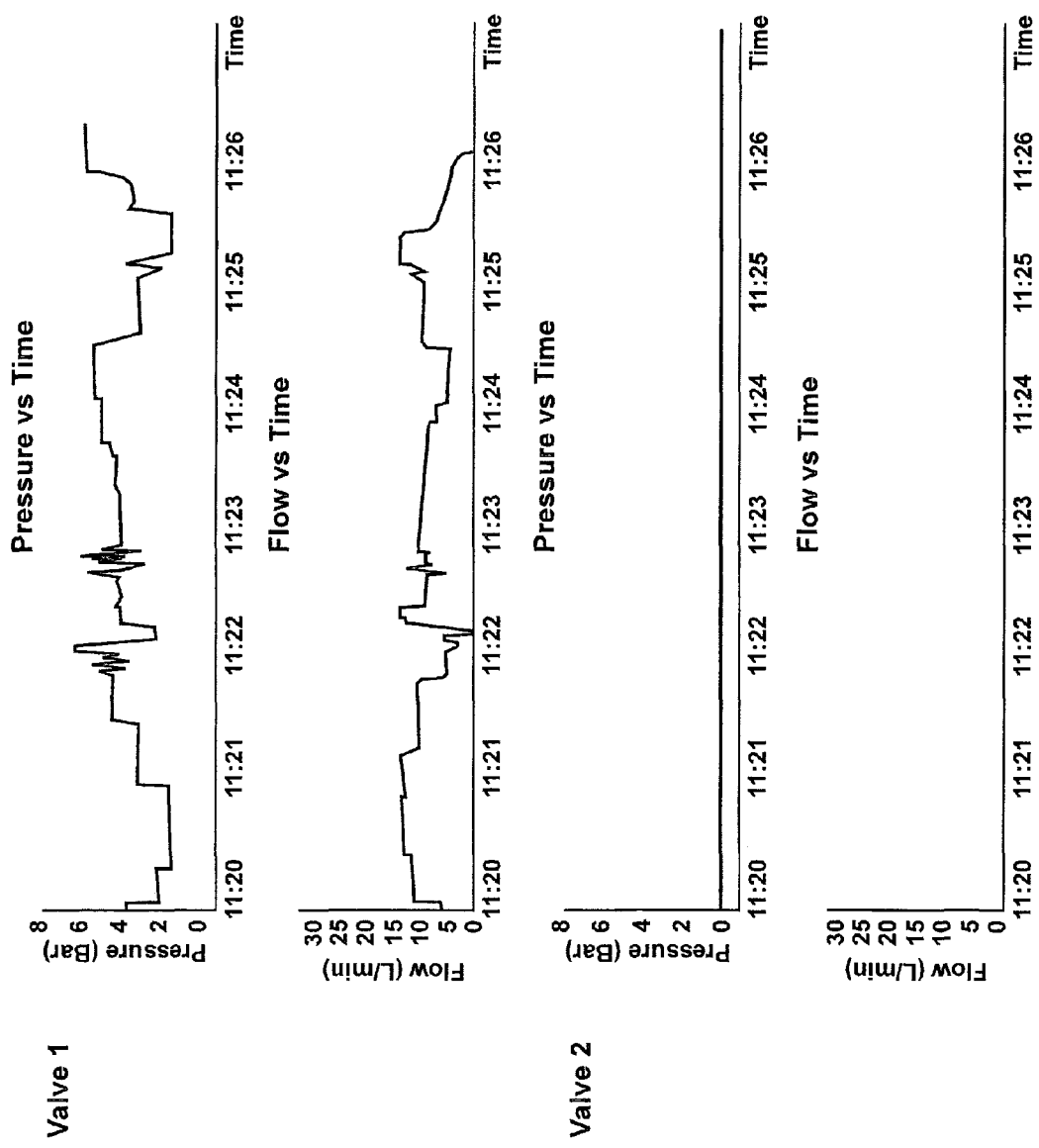

FIG. 20 shows a pair of graphs for valve 1 the top graph plotting pressure against time and the lower graph showing the flow rate against time where the time axis is the same for the two graphs.

Figure 21:
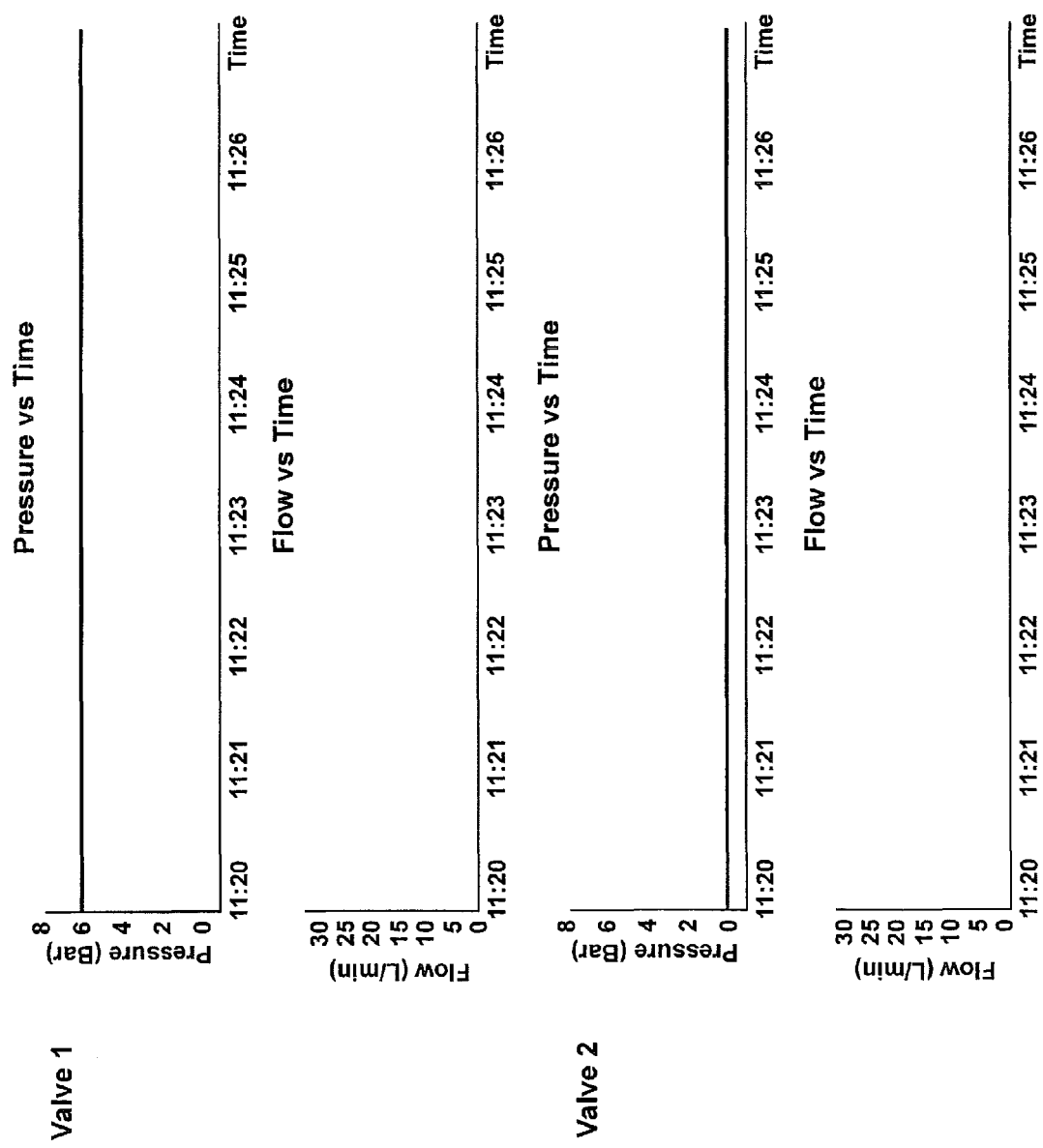

FIG. 21 shows a pair of graphs for valve 1 with the valve in a different condition.

Figure 22:
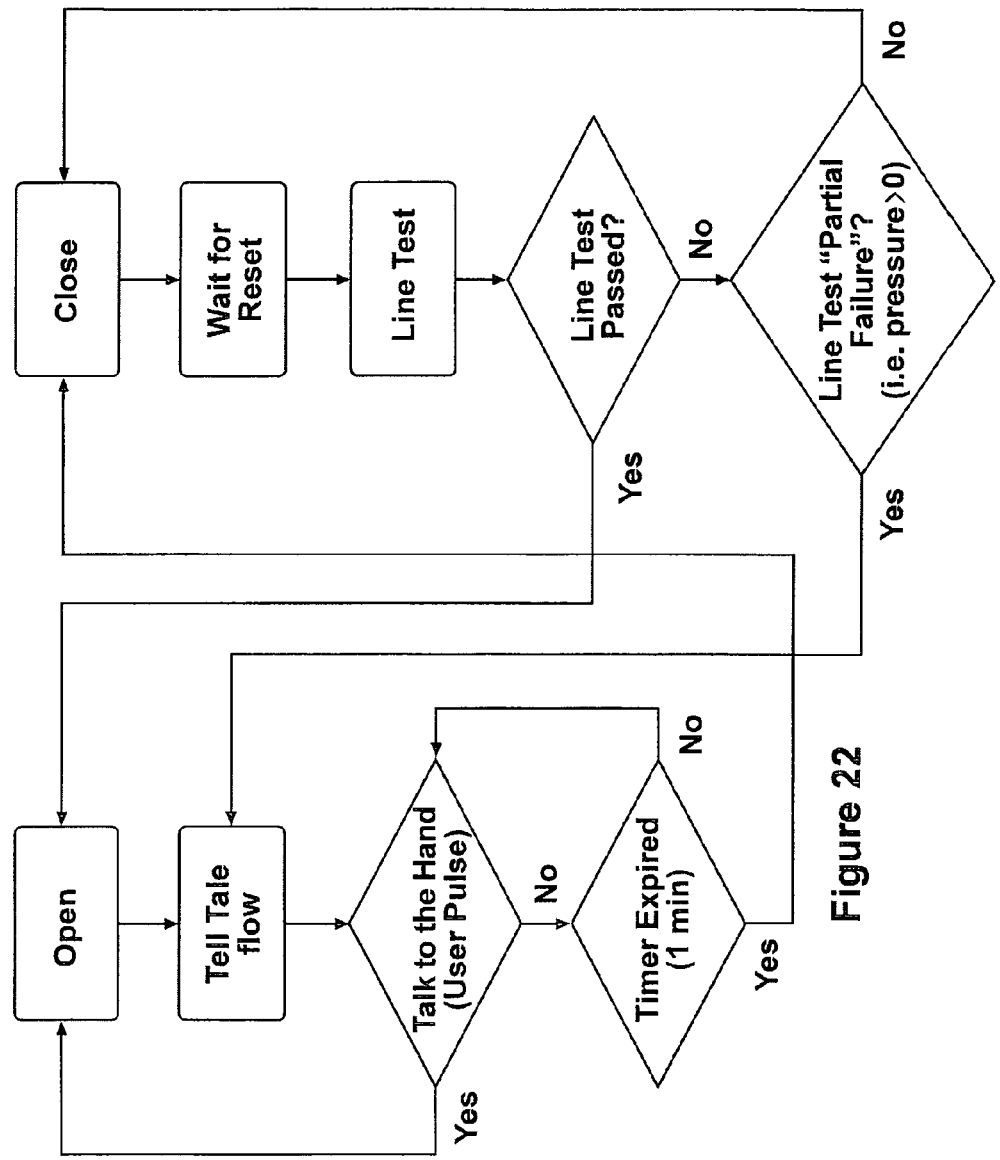

FIG. 22 is a flow chart for a programme in the controller to control flow limitations.

Figure 23:
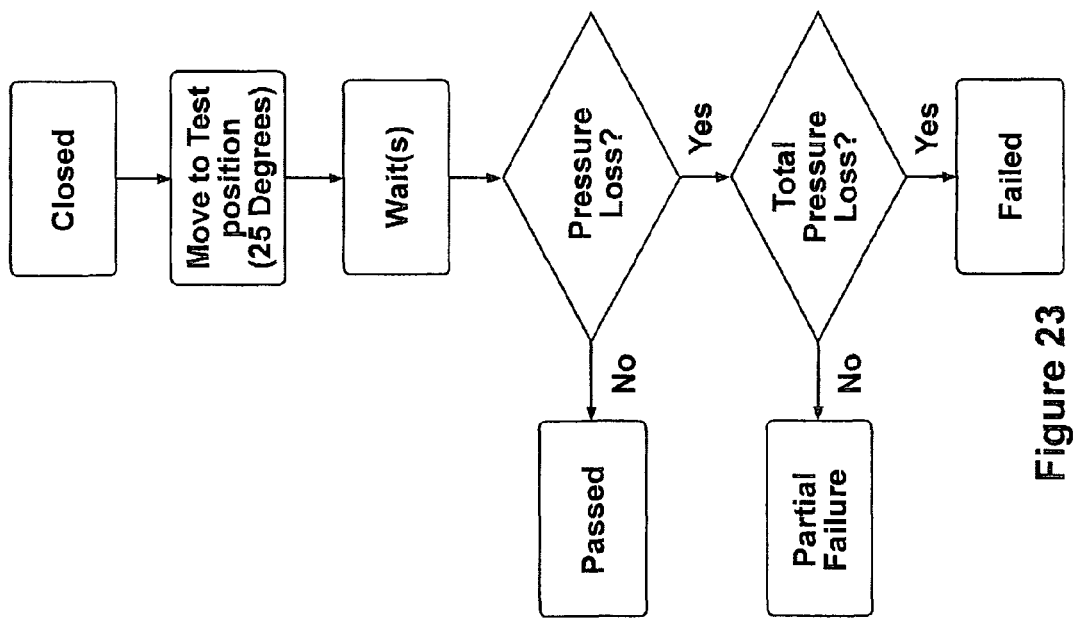

FIG. 23 is a programme to control line test.

Figure 24:
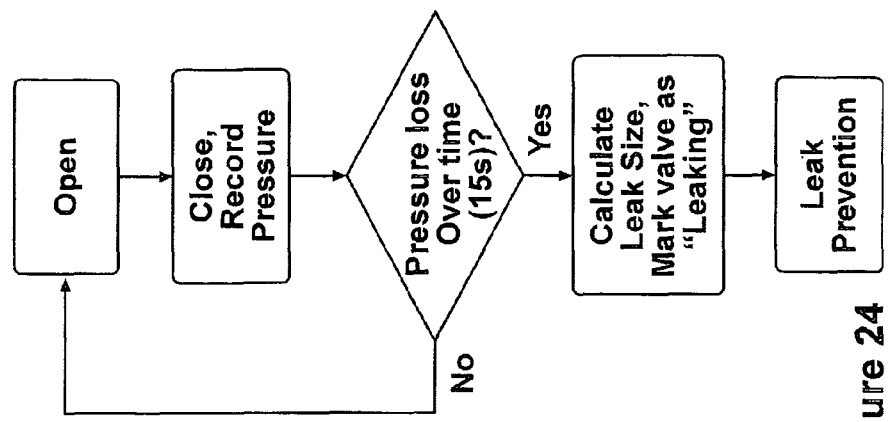

FIG. 24 is a programme to control leak detection.

Figure 25:
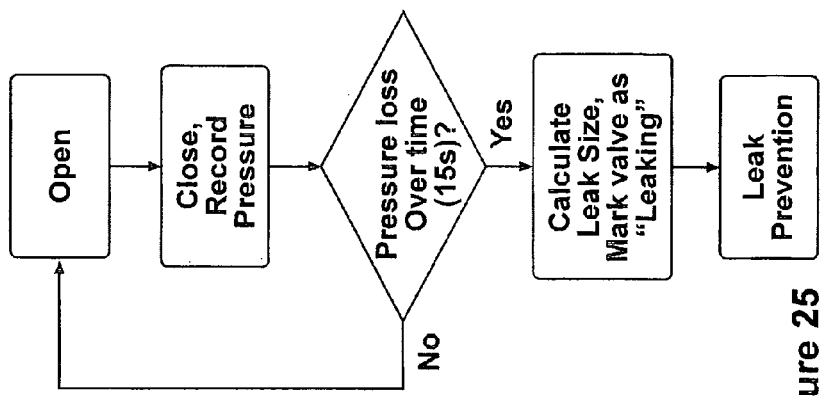

FIG. 25 is a flow chart to control a self test.

Figure 26:
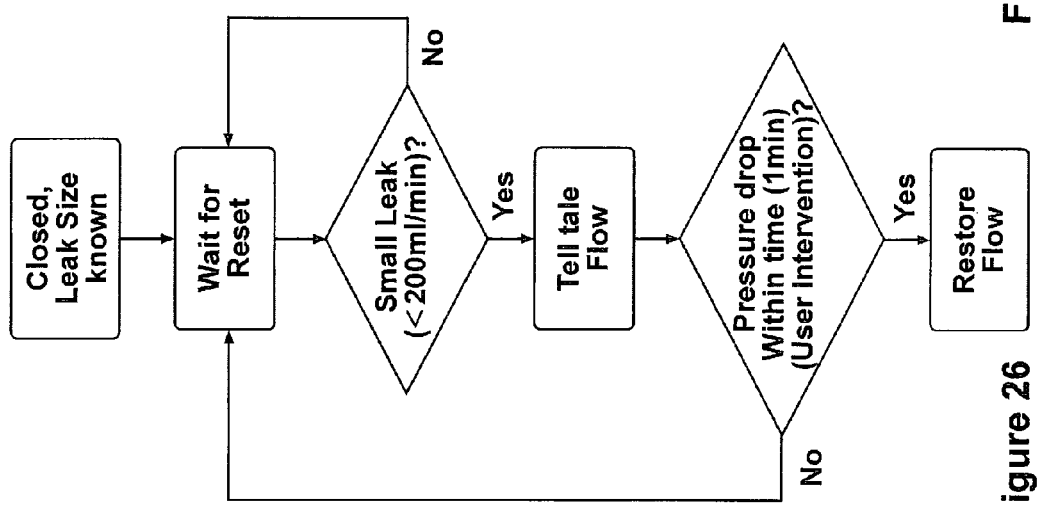

FIG. 26 is a programme to control leak prevention.

Figure 27:

FIG. 27 is a flow diagram to control leak shut down.

Figure 28:
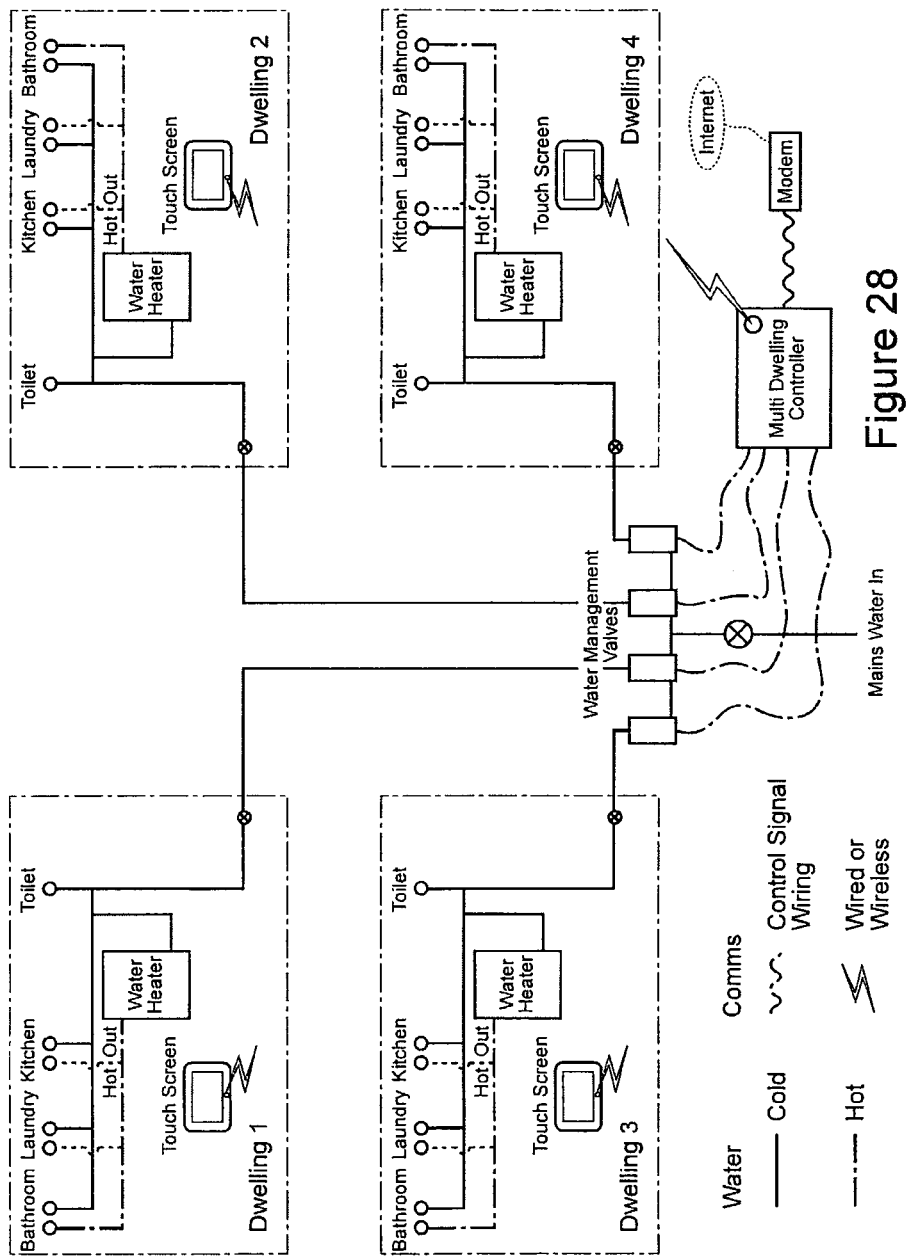

FIG. 28 is a schematic view of a multiple dwelling with centralised management.

Figure 29:
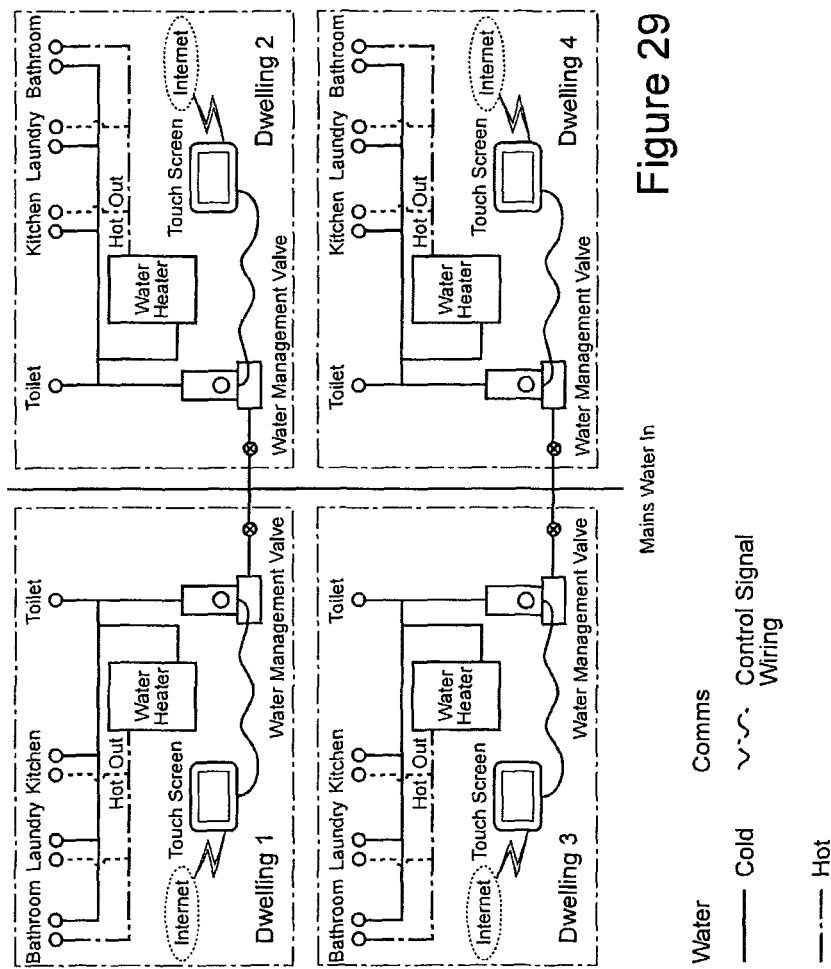

FIG. 29 is a schematic showing a multiple dwelling with individual management of the water usage.

Figure 30:
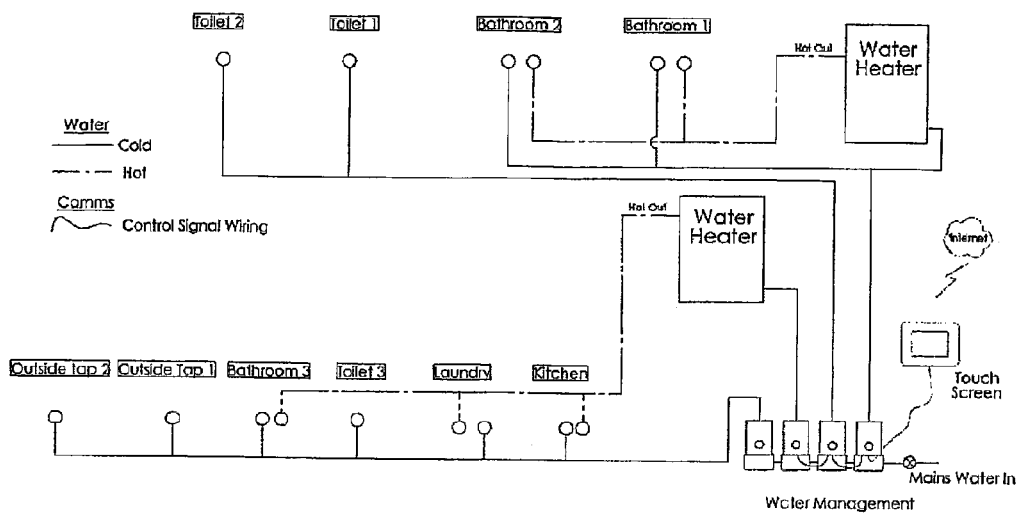

FIG. 30 is a schematic showing an installation for a single dwelling with multiple water zones.

Figure 31:
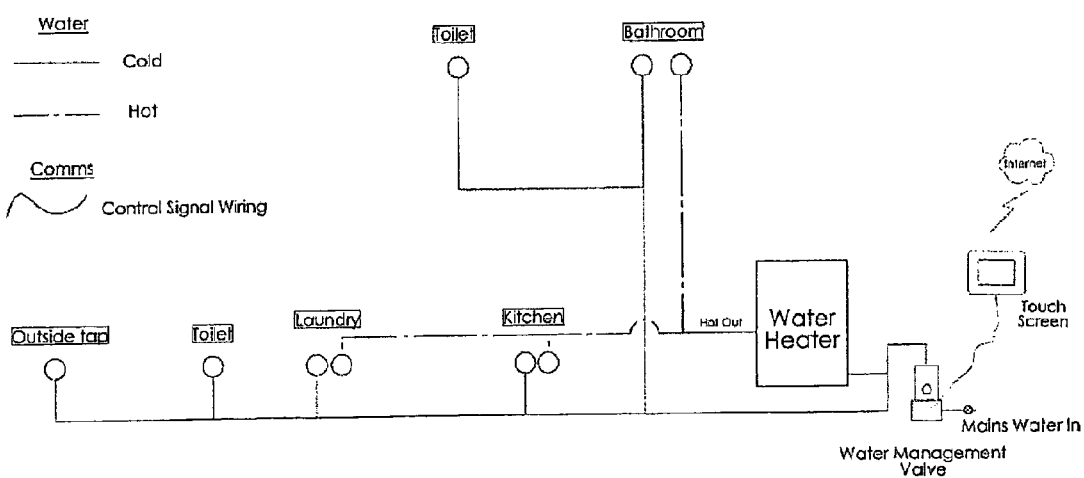

FIG. 31 is a schematic showing a single dwelling using a single valve.

Figure 32:
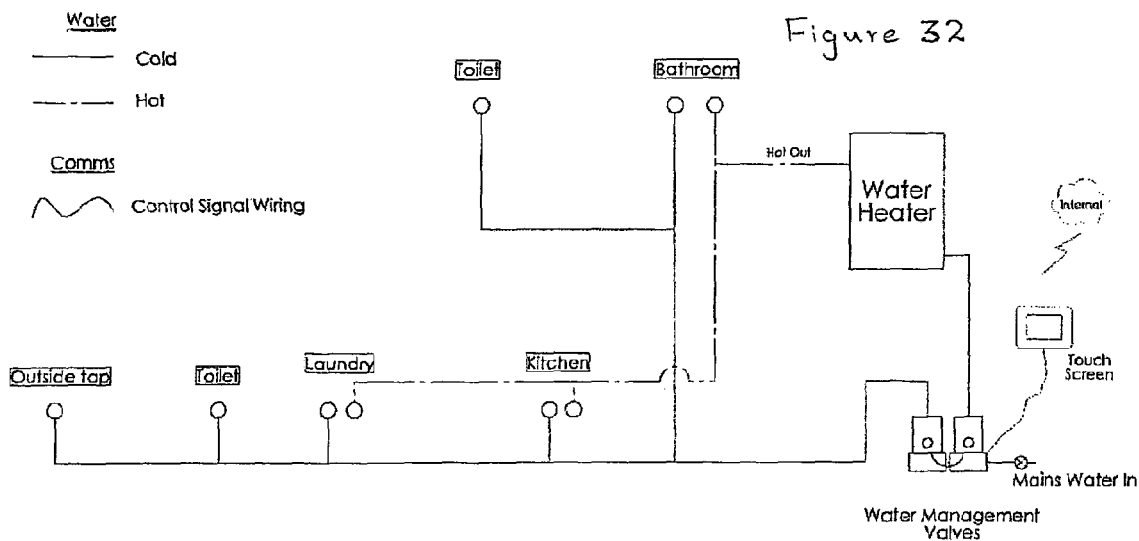

FIG. 32 is a schematic showing the installation of the equipment in a single dwelling but using a two valve pair specifically control the cold water supply and the hot water supply.

Figure 33:
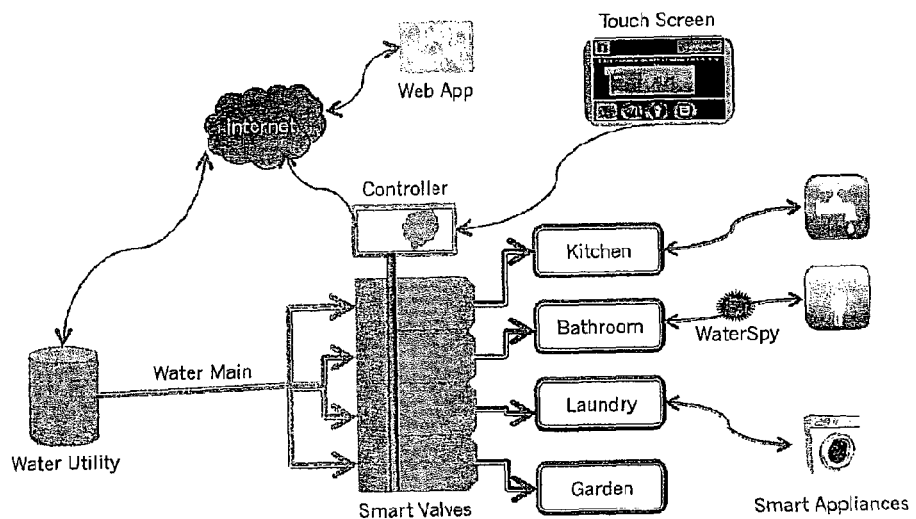

FIG. 33 is a schematic of how the system connects to the internet, showing also the touch screen as the user interface for the controller.

Figure 34:
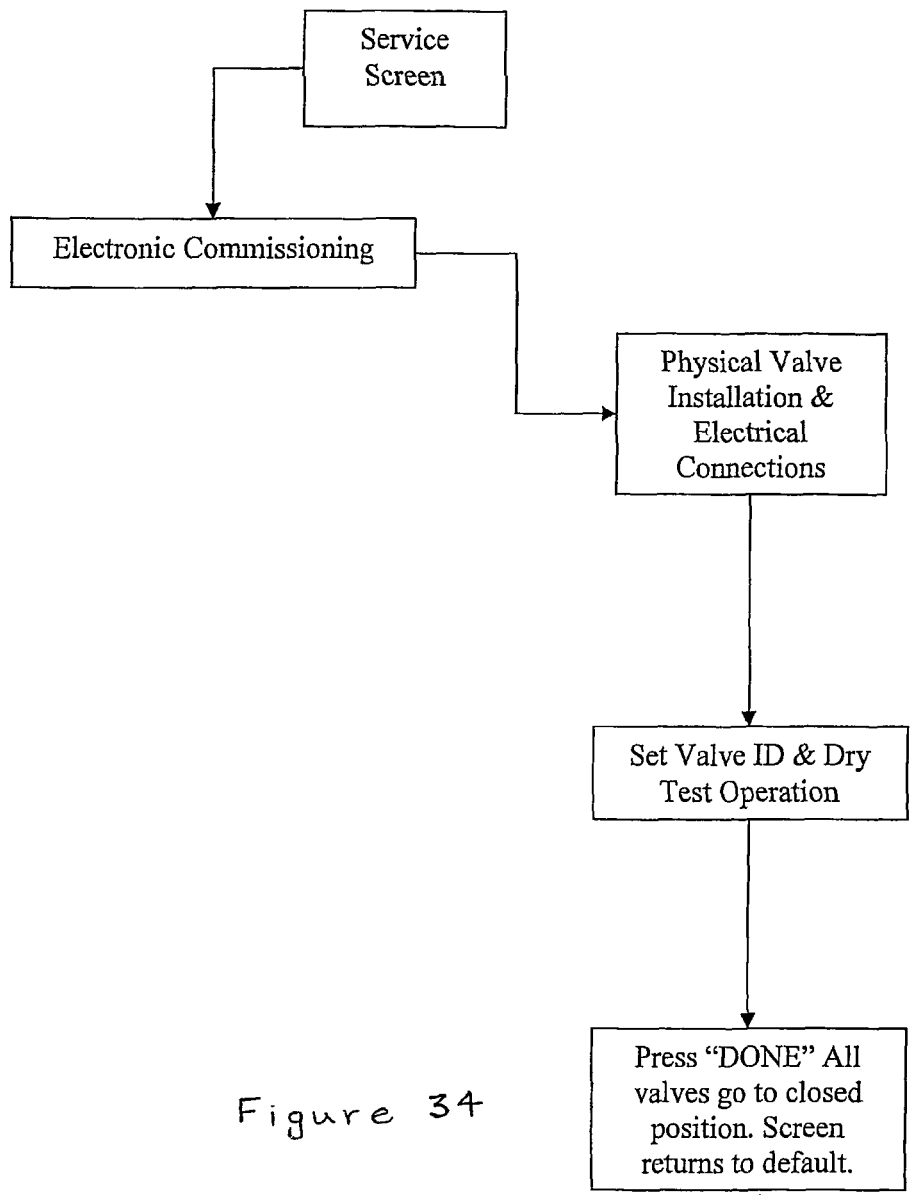

FIG. 34 is a flow chart showing the electronic commissioning of the water management system.

Figure 35:
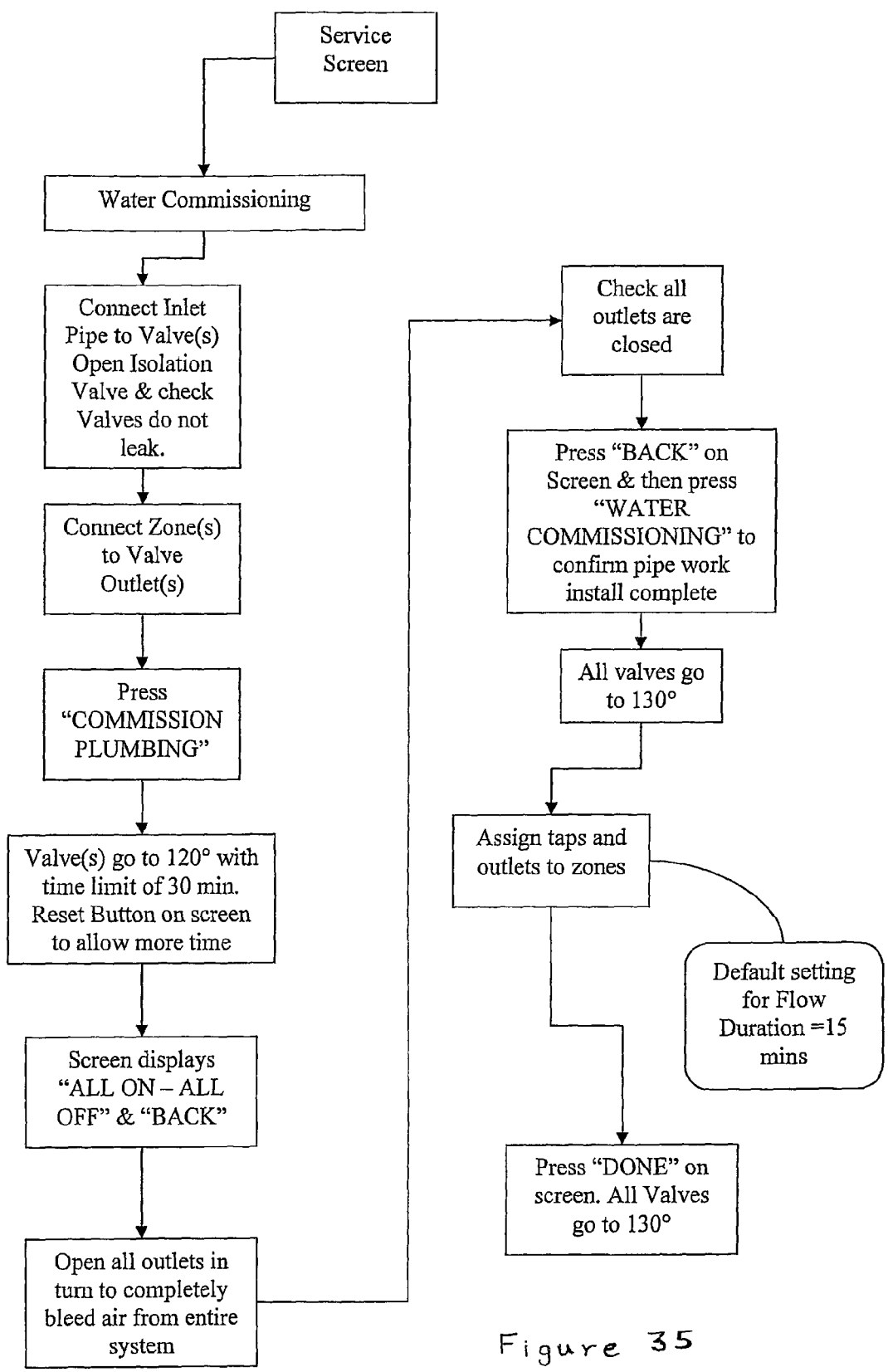

FIG. 35 is a flow chart showing the water commissioning (the plumbing work) for the water management system.

Figure 36:
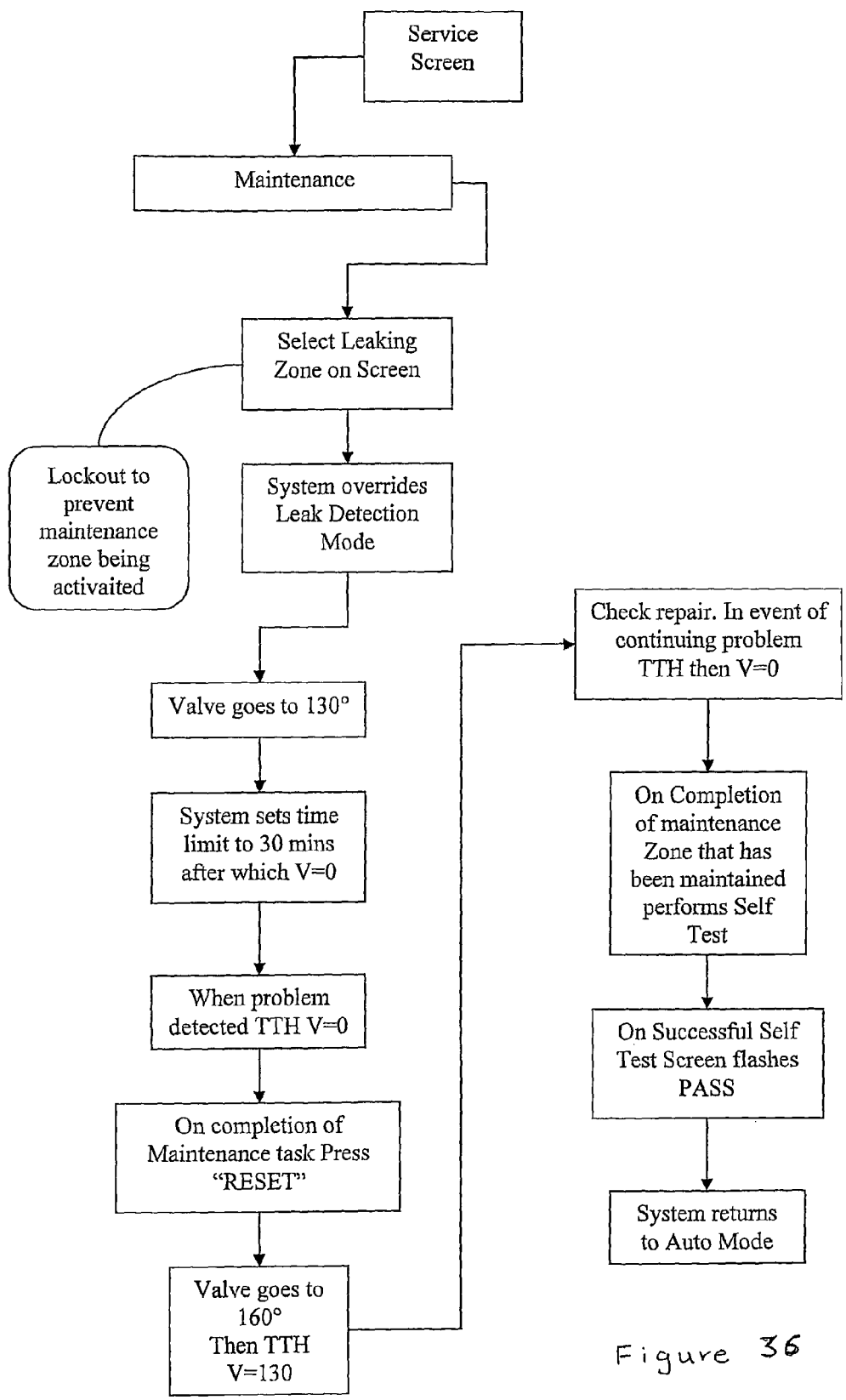

FIG. 36 is a flow chart showing the steps involved in a maintenance procedure for the water management system.

Figure 37:
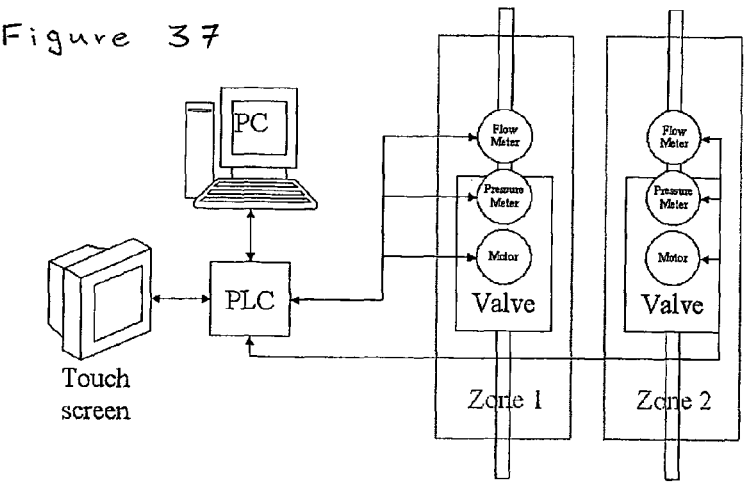

FIG. 37 is a hardware overview of the installation of FIG. 18 but further including a personal computer for testing purposes.

Figure 38:
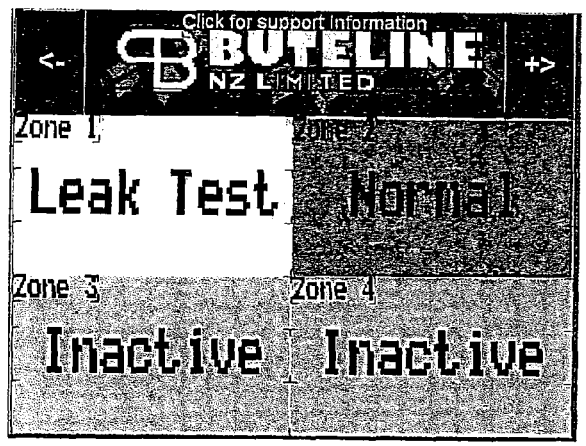

FIG. 38 shows a user control in the form of a touch screen having four touch zones or buttons.

Figure 39:
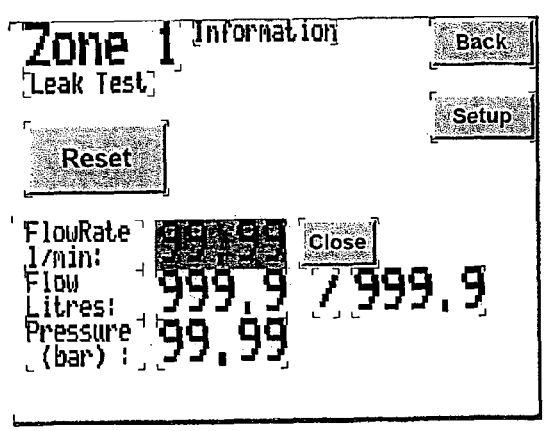

FIG. 39 shows the same touch screen but with a different display showing flow rate and pressure.

Figure 40:
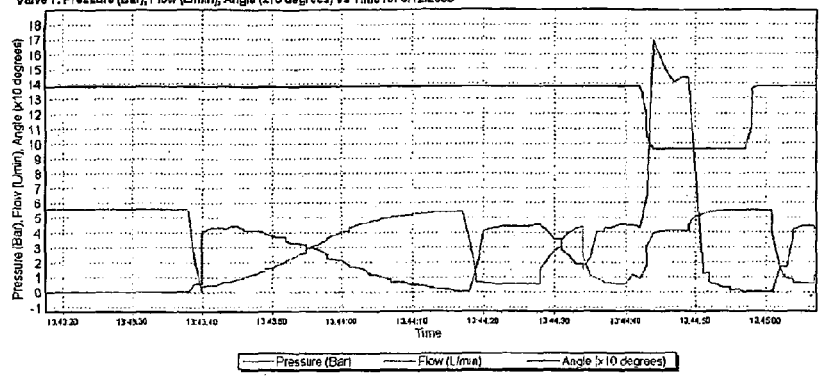

FIG. 40 is a graph showing the "talk to the hand" concept, the graph showing pressure, flow rate, and valve opening in (×10°).

Figure 41:
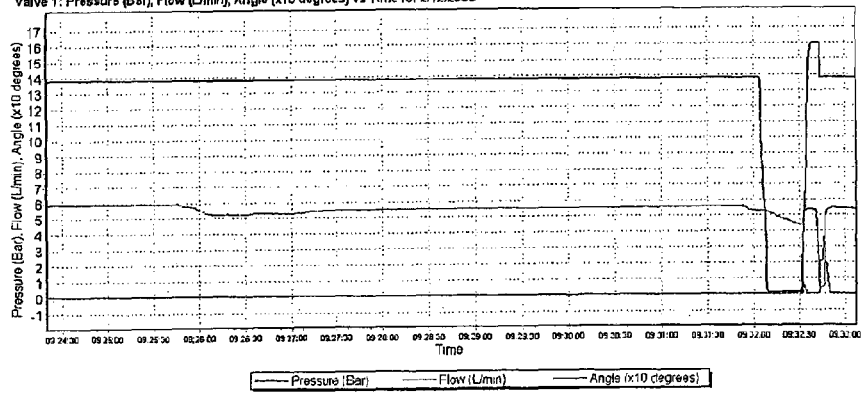

FIG. 41 shows a graph of the "leak detection" programme, again showing pressure in bar, flow rate in minutes per minute, and the valve opening (×10°).

Figure 42:
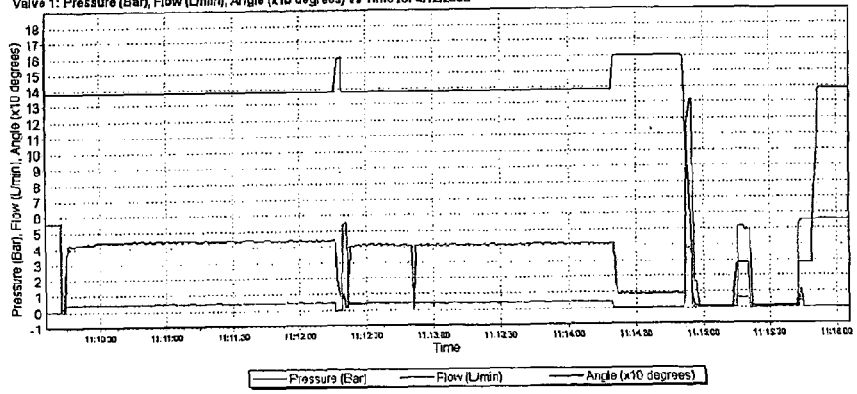

FIG. 42 shows a graph the flow limitation programme, again displaying pressure flow rate and valve opening angle.

DETAILED DESCRIPTION OF THE PREFERRED EMBODIMENTS

Terminology

"Are you there?"—This refers to situations where the user turns on a shower, or water to the bath, or some other point, particularly where they wish to run the shower until the water reaches a desired temperature. This is a particular problem in households where the shower head is some distance from the hot water cylinder. By providing a temperature sensor in the shower head and/or a cut off valve in the shower head the system can allow the water to flow until the shower head reaches a desired temperature and then immediately switch off flow to the shower head. This can be done at the electrically controlled valve described in the specification, or in a separate shut off valve at the shower head. In either event the user will have left the shower control in the open position, but water is no longer flowing through the shower head. If the user is there then the user needs to close the shower control, and the peek-a-boo function which can be set to operate every 30 seconds or so will detect that the shower control is now closed and will allow the valve to open or send a signal to open the shut off valve in the shower head.

"BAS"—refers to "Building Automation Systems".

"Controller"—the controller refers to a microprocessor based computer which controls the movement and position of the electric motor of the valve. In this specification the controller is described as a microprocessor, a microprocessor controller or a PLC interchangeably. In the first prototypes we used a PLC (programmable logic controller) but in production we prefer to use a purpose designed microprocessor based computer.

"Faucet"—A user operated valve at a water outlet, in English terminology this is referred to as a "tap". In the specification the term "tap" and the term "faucet" are used interchangeably.

"Follow me"—This refers to the need to give exclusive control to certain outlets, and in particular a domestic shower, so the system can be programmed that when a shower is running, the water supply to appliances, and other faucets and other outlets will be limited to a low flow rate so as not to adversely influence the pressure or water supply to the shower head. Most appliances such as dishwashers, washing machines will not be adversely effected by a lower than normal flow rate for a period of time while the shower is running, but the converse is not true.

"Flow Limitation"—The system allows each of the zones to be subjected to a "flow limitation" which specified the maximum time the zone would be allowed to receive a continuous flow of water. If this time is exceeded, the valve would be moved to the closed position, and must be reset from the control panel. However if the flow is discontinued momentarily before the timer expires, then the timer will be reset.

"Instant warm water"—This refers to a modification of the soft start flow rate that allows cold water faucet to supply warm water at say 40° C. to enable a user to wash their hands for say 20 seconds, before the flow through the cold water faucet reverts to cold water flow. This is described in more detail below.

"Leak Detection"—To perform "leak detection" the controller will close the valve and monitor it looking for a drop in pressure. If a pressure drop is detected, then the system will alert the user to the presence of a leak.

"Line Test"—This is a pressure test of a particular line. It allows the controller to detect the presence of a major leak, or for example a faucet left in the open position, without the system discarding or wasting a large amount of water. As will be described below the controller moves the valve from the closed position to the "line test" position, and if a constant pressure is maintained in the line, then the "line test" is considered as a pass. This line test is described in more detail below.

"PCB"—Printed circuit board attached to the valve described in Example 2. It houses the microprocessor controller on-board.

"Peek-a-boo"—This refers to intermittent pressure test of lines to see if a faucet has been left open. The system can intermittently test each zone, by opening the valve, checking the pressure build up in the line supplying that zone, and if the pressure does not build up quickly, because there is a leak in the line or a faucet has been left open, then the system detects that there is fault with the line and will close the valve and report this as a problem.

"Point of Use"—This refers to the point at which water is consumed, for example in homes, apartments, hotels, commercial buildings, whether the water leaves the plumbing system via a faucet, shower head, or valve to an appliance such as a washing machine or dishwasher. Point of use refers to anywhere where the water is consumed for direct human use, and is lost to the water supply system.

"Smart Building" A building having a plurality of sensors connected to an automation system, typically controlling the solar input or air vents. It includes "Smart Homes" and "Smart Offices" using "BAS".

"Soft Start"—This refers to a means for limiting the initial flow of water, so that the user is not met by a gush of water when a tap or faucet is first opened. The system controls the opening of the valve so that it is first positioned in the partial metering position (described below) and is then allowed to gradually move to a flow rate configured for that particular zone. This process is referred to "the soft start flow rate".

"Sub Metering"—the industry term for metering/billing at a zoned or smaller level than the main building utility meter—e.g.: apartments, offices, hotels, etc.

"Talk to the Hand"—This refers to the detection of one or more rapid pressure changes initiated by a user rapidly switching a faucet ON or OFF. "Tell tale position"—It is a position of the valve of Examples 1 and 2, where only a trickle or tell tale amount of water is passed through.

"Times up"—This refers to a timer and flow control function, particularly for use with showers, or other outlets where a considerable amount of water might be used. If the system has been configured to limit the total volume of water to be used in a shower, it can detect the flow rate, and time, and when a preset amount of water has been used up, the system can move the valve to a lower flow position, so that the person using the shower will notice that there has been a sudden reduction in the flow rate, and realise that water supply to that shower is about to be turned off. Any number of different signals can be provided to the user, for example changing the flow rate so that it pulses, or shuts off for one or two seconds and then starts again, in order to obtain the user's attention.

"Zone"—In this specification we use the term "zone" to mean a geographical location, or a group of similar taps or valves, or similar water outlets. By way of example, "A zone" provides the means to control the flow of water to a specific section of the house. It consists of a valve, motor assembly and the sensors with which to control the valve position. This zone will contain its own quotas and user specific setting allowing the software's supervisor control over an individual's water requirements. It is anticipated that a house will require one zone per bedroom. E.g. a 4 bedroom house may consist of 4 zones.

"Zone Quotas"—Each zone will be allocated a limited supply based on a total daily quota. If the quota for that zone is exceeded, the system can be programmed to still allow a flow of water in that zone but at a reduced flow rate.

EXAMPLES

The first two examples will describe the best valve for use with this water management system, this description taken from my co-pending patent application entitled Valve, and filed as NZ patent application 571667 and in the related co-pending PCT application.

Example 3 (and FIG. 18) onwards will describe various plumbing installations using the water management system of this invention where the valve of examples 1 or 2 is controlled by a controller and an appropriate user interface.

Example 1

Figure 3:
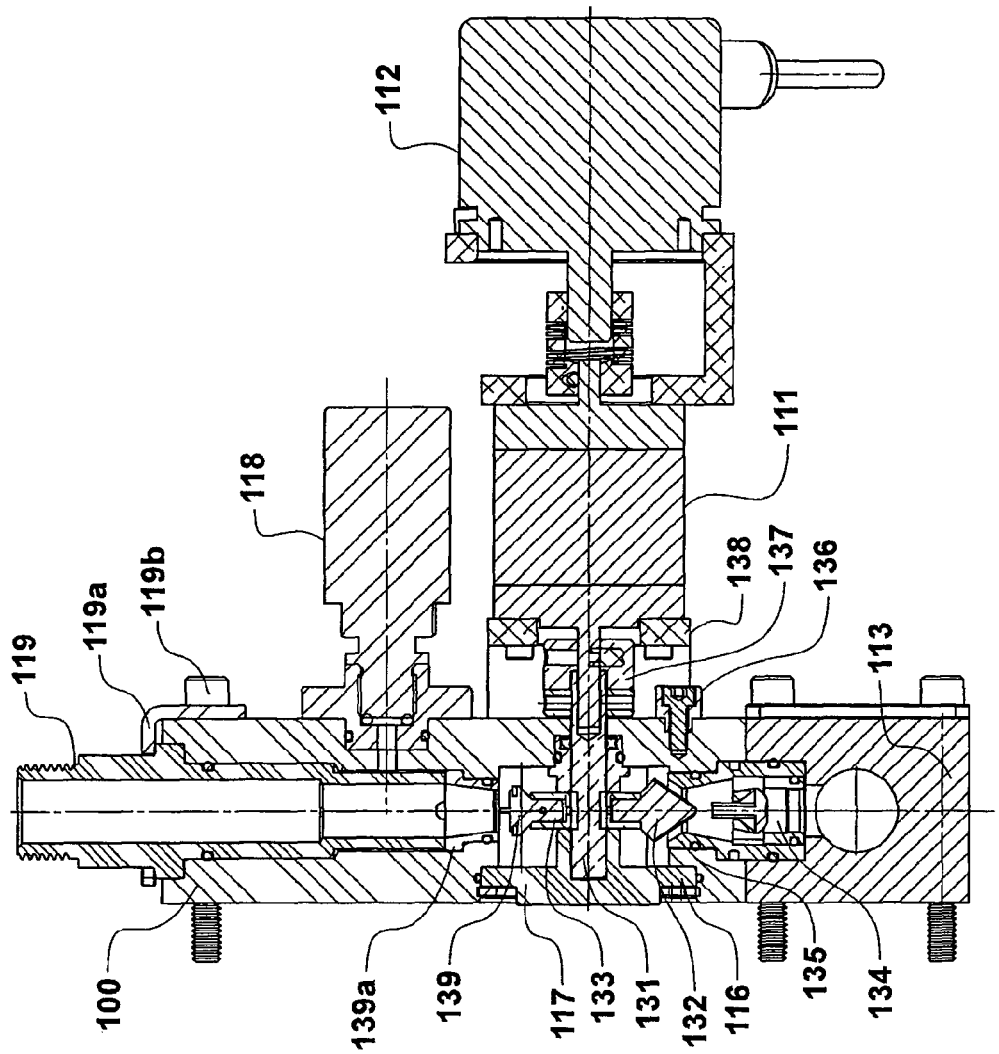
FIG. 3 is a first cross-sectional view through the valve body showing the relationship of the crank pin to the valve components.
Figure 5:
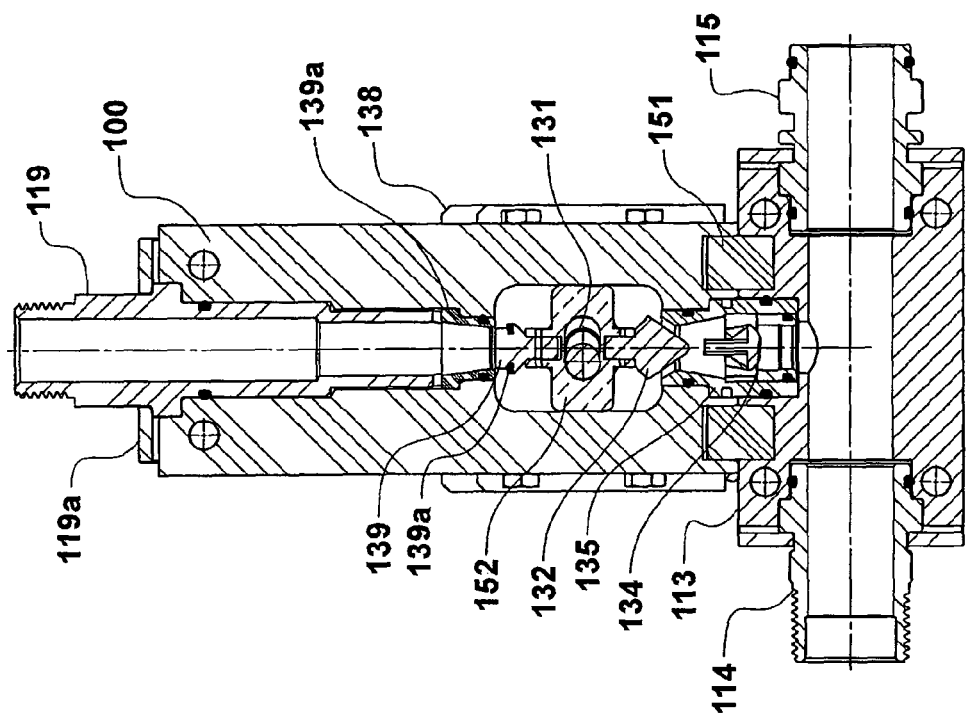
FIG. 5 illustrates a second cross-sectional view through the valve body showing the relationship of the metering valve body and the shut-off valve body.

The prototype valve body for use with the water management system of this invention can best be understood from the cross sectional views of FIGS. 3 and 5. Looking at FIG. 1 it is apparent that there is a valve body 100 connected to an electric motor 111 and a shaft encoder 112, such that the electric motor causes a crank pin 131 to rotate. The crank pin passes through the centre of the valve body at right angles to the main rectangular axis of the valve body.

Figure 1:
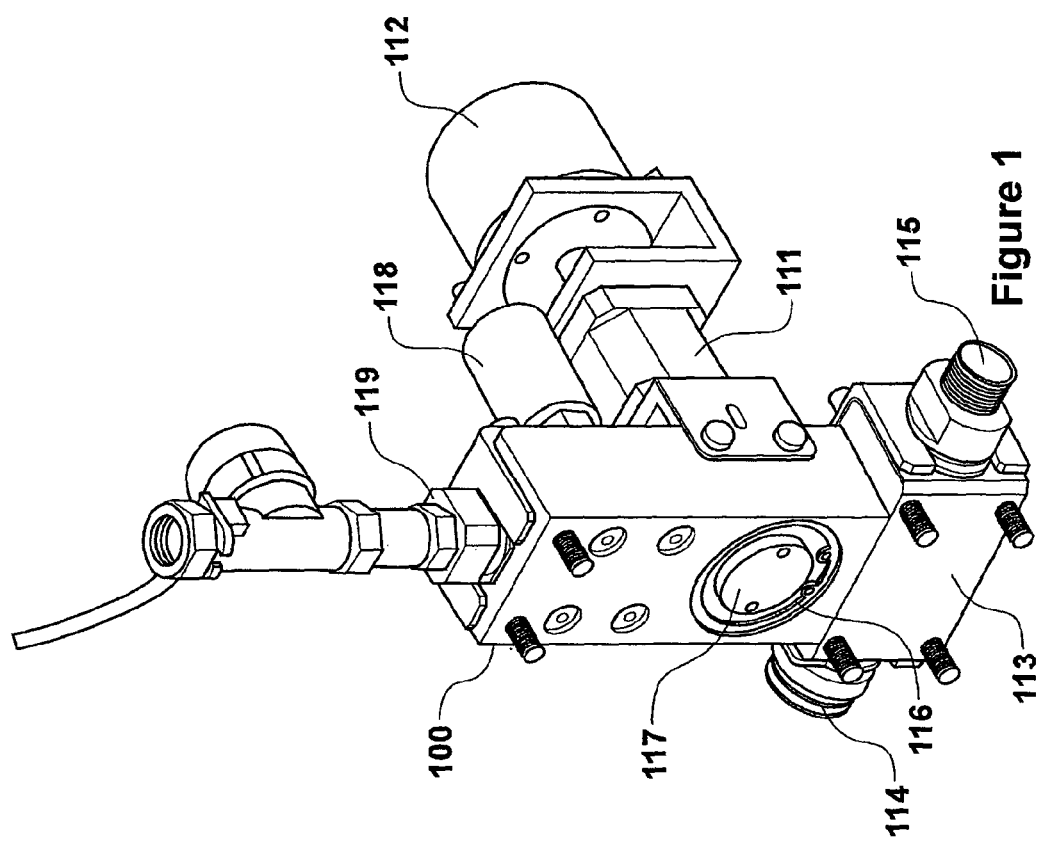
FIG. 1 illustrates a perspective view of a valve body particularly suited to the water management system of this invention. This figure shows a portion of the pressure transducer, electric motor, and shaft encoder extending from the front face of the valve body.

At the bottom of the valve body there is the intake manifold 113 with inlet connector 114 at the left hand side of FIG. 1, and a connector 115 at the right-hand side of FIG. 1. These connectors enable a number of valve bodies to be connected together to a common inlet pipe.

Figure 2:
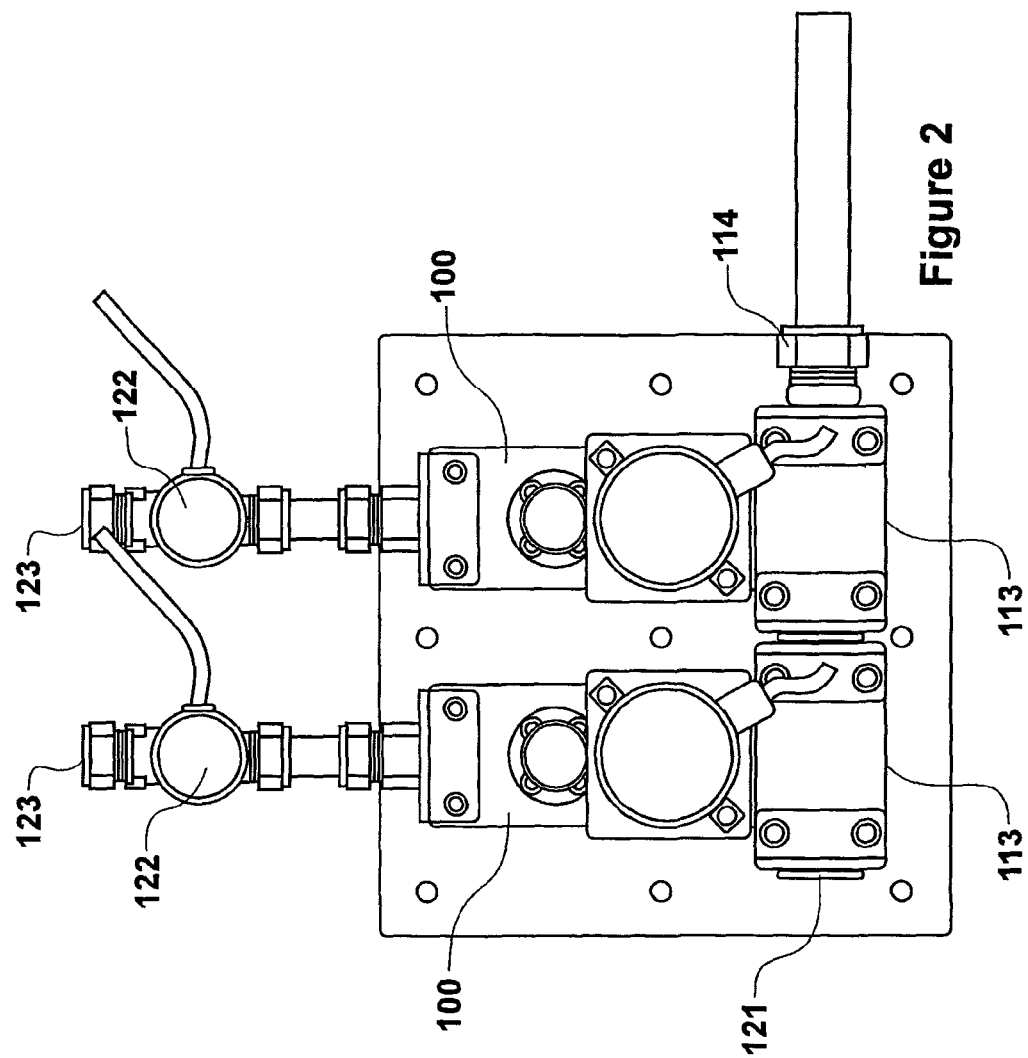
FIG. 2 shows a front elevation of a pair of valve bodies connected together, each having a flow meter connected to its respective outlet.

FIG. 2 shows a pair of valve bodies connected together with the inlet connector 114 on the right-hand side of FIG. 2, and an end unit blanking plug 121 positioned at the left hand side of the leftmost valve body.

In FIG. 2 water flows from the inlet water pipe via the inlet connector 114 into the manifold 113 and then up through the centre of the respective valve body so that when the metering valve 132 and the shut-off valve 133 are both in the open position water will flow out the top of the valve body, and in the case of FIG. 2, through a flow meter 122 to a respective outlet 123. The outlets 123 and flow meters 122 are labeled as zone 1 and zone 2. The valve of this invention has particular application to water conservation and management as will be apparent from the following description, but it is not limited to such an application.

Looking now at the cross sectional views of FIGS. 3 and 5 it will be apparent that the valve motor 111 (preferably an electric stepper motor) causes its shaft to rotate on command, and will cause the shaft to move through a number of steps. The shaft is connected to a crank pin 131 and the crank pin is held within a hollow keeper which in turn is connected both to the shut-off valve 133 and also to the metering valve 132. The aperture passing through the manifold module 113 connects at right angles with an aperture which extends upwardly via a non return valve 134 into a tapered throat which forms the valve seat 135 for the movable portion of the metering valve.

The metering valve 132 is shaped in the form of a conical body capable of moving into or out of engagement with the throat, and when fully lowered its tapered sides will mate against the tapered sides of the upper portion of the throat to cause the metering valve to close off the water flow through the throat. In practice it does not fully close off the water flow because of the presence of a telltale groove which is shown in more detail in FIG. 6. Also shown in this central portion of FIG. 3 is a motor overrun stop 136, a motor coupling 137 and a mounting bracket 138. Below the metering valve body there is a retaining circlet 116, and the metering valve seat 135 forms part of the non-return valve housing.

Surrounding the crank pin is the keeper which will be shown in more detail in FIGS. 7-11 showing the operation of the valve as the crank rotates between different positions.

Above the keeper there is a valve cavity plug 117, which is connected to the shut-off valve. The shut-off valve is shown in detail in FIGS. 7-11 and is visible in the cutaway view of FIG. 6.

Figure 4:
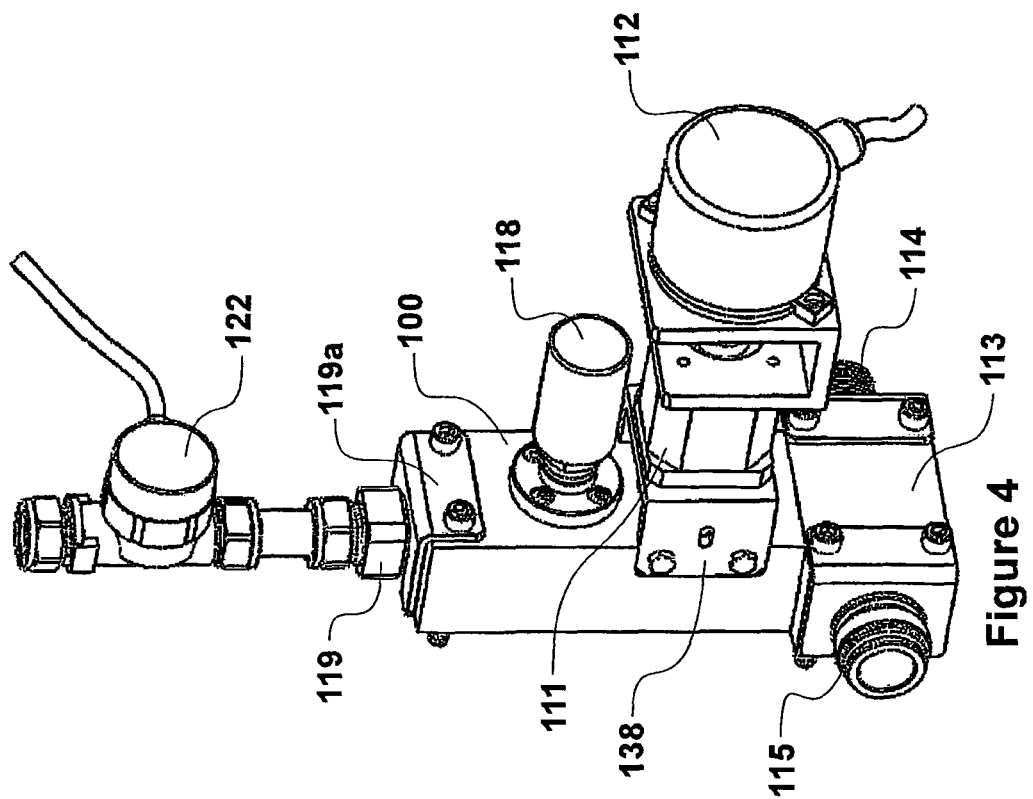
FIG. 4 illustrates a front perspective view of the valve body of FIG. 1 showing the location of the pressure transducer and shaft encoder in more detail.

The shut-off valve 133 has a seal 139 designed to seal against the shut-off valve seat 139*a*. To the top right of FIG. 3 there is a pressure transducer 118 connected via a small aperture to the outlet passageway situated above the shut-off valve seat. The top of the valve body has an outlet connector 119, a connector retainer 119*a* and a retaining screw 119*b*. To the right of FIG. 3 a shaft encoder 112 is connected to the electric motor, so that the position of the stepper-motor is accurately controlled. FIG. 4 shows a rear perspective view of FIG. 1, showing the location of a flow meter 122 connected to the outlet connector 119 at the top of the valve body. This is the flow meter that is shown in FIG. 2, and is also shown in FIG. 1 (but not labeled in that figure).

FIG. 5 shows a cross-sectional view at right angles to that FIG. 3. It shows in more detail the joiner connector 115 and the inlet connector 114 of the inlet manifold 113, it shows a connector retainer 119*a*, a location Dowel 151, and the non return valve 134 which sits below the throat of the metering valve 132. It shows the shape of the movable keeper which has a central aperture containing the crank pin 131.

Above the keeper, is the shut-off valve seal 139 and shut-off valve seat 139*a*. At the top of the valve body there is a connector retainer 119*a*, and the outlet connector 119 is shown having an external screw thread connection to the appropriate pipe fittings. Since the valve has been designed for use with plumbing fittings, it can utilize a standard threaded connection.

FIG. 6 shows the position of the shaft encoder 112 electric motor 111 and its couplings 137, 161, and the internal components of the valve body (with the valve body completely removed for the purpose of explanation). The key point of FIG. 6 is to illustrate the presence of at least one telltale groove 162 which is a small groove extending downwardly on the lower tapered portion of the metering valve body. This groove is small enough to allow a very small flow of water through the metering valve 132 even when the metering valve plant is fully depressed and is otherwise in sealing contact with the throat of the metering valve seat. Only one such groove is visible in FIG. 6. In practice I prefer to use two such grooves 180° apart. But any number of grooves may be provided to allow a small flow of water through the metering valve when the shut-off valve is in the "OPEN" position.

The other feature of FIG. 6 which is readily apparent is the shape of the crank pin 131 with its central shaft and offset crank which sits within the keeper body otherwise referred to as the "valve crank" 152. The keeper body is a substantially rectangular block with an approximately oval shaped aperture. As shown it has upper and lower flat surfaces and semi-circular portions at each end to match the shape of the circular crank pin.

Extending from the bottom of this keeper body is a shaft or stem which forms part of the conical top shaped metering valve body. Extending above the keeper body is a further shaft which forms the stem of the shut-off valve 139 which seals against the face of the shut-off valve seat 139*a*.

Turning now to FIGS. 7-11: They show that rotation of the stepper-motor causes the crank pin 131 to move through a number of different positions. In these positions we have used the compass positions to show the position of the crank pin 131 relative to the aperture in the keeper body. In the sequence of drawings, the crank pin appears to rotate anticlockwise when viewed from FIG. 7 starting with the crank pin in the northern position and then moving to the north-west position of FIG. 8, the westerly position of FIG. 9, the southwesterly position of FIG. 10 and down to the southern position of FIG. 11.

In FIGS. 7 to 11, we have shown the crank pin 131 moving through 160° (see also FIG. 12 for the range of movement) moving through the westerly half of the drawings. As of the symmetrical nature of the keeper, it is possible for the stepper motor to rotate through the easterly half of the drawings, and still achieve the same opening and closing arrangements. In designing this valve with a symmetrical keeper, I envisage that the controller and stepper motor could be programmed so that the stepper motor will operate in say the westerly quadrant for the first one million cycles, and then the preset to operate on the easterly quadrant for the next one million cycles. The controller can include a counter to count the number of opening and closing of the valve, to allow for any wear within the crank pin and the interior of the keeper. Alternatively instead of counting a fixed number of cycles for one quadrant and then switching to the other quadrant, the valve may include a sensor to detect the quadrant in use, and alternately switch to the opposite quadrant in order to extend the operating life of the valve.

In another variation it may be desirable to switch from the westerly quadrant to the easterly quadrant at set time periods, to minimize wear in either half of the keeper or portion of the crank pin exposed to the interior of the keeper.

Of course, if the valve body is viewed from the orientation of FIG. 4, then the valve motor 111 will seem to rotate in a clockwise direction from the position of the angular encoder 112, but looking at it from the views of FIG. 7-11 it will appear that the crank pin 131 rotates in the counterclockwise direction. The orientation of the motor and whether the crank pin 131 is seen to move in a clockwise direction is immaterial, what matters is the position of the crank pin relative to the metering valve and the shut-off valve.

For Example in FIG. 7 with the crank pin 131 in the northern position (see table of valve positions) the shut off valve 133 is fully closed but the metering valve 132 is fully open.

In FIG. 8 with the crank pin 131 in the North West position, the shut off valve 133 is now open and the metering valve 132 is approximately ¾ open. The telltale groove is visible on the surface of the metering valve in FIGS. 7 and 8.

In FIG. 9 as the crank pin 131 moves to the westerly position, the shut off valve 133 is now almost fully open, but the metering valve 132 is now partially closed to control the flow rate through the valve.

In FIG. 10 the shut-off valve 133 is now fully open as the crank pin moves to the southwest position, but the metering valve 132 is now almost fully closed.

In FIG. 11 the crank pin 131 moves to the southern most position, the metering valve 132 is fully closed (except for the effect of the telltale groove 162) and the shut-off valve 133 is now moving towards the valve seat. At this point it is still fully open, further rotation will cause it to move back towards the valve seat.

FIG. 12 and Table A shows the relative position of the crank pin to the flow rate through the valve.

TABLE A

| Function | Angle | Description |
| --- | --- | --- |
| Closed | (0 degrees) | The valve is totally closed in this position. |
| Line Test | (~25 degrees) | The valve is positioned just off its closed position with a small amount of water passing through. |
| Fully Open | (~90 degrees) | The valve allows an unrestricted flow of water through. |
| Controlled Flow | (~90-160 degrees) | When in this position, the flow of water can be controlled in a linear fashion with the flow decreasing gradually until the Full Metering position is reached. |
| Partial Metering | (~140 degrees) | The valve is almost at its full metering position and allows a. small amount of water through. |
| Full Metering | (~160 degrees) | The valve in this position only allows a trickle or "tell tale" amount of water through. |

Preferably the position of the crank pin is controlled by the stepper-motor, and the stepper-motor is in turn controlled by a controller which receives signals from various sensors to control the precise position of the stepper motor and hence the precise position of the crank pin. The controller receives signals from the shaft encoder as well as signals from the flow meter and the pressure transducer so that information on the pressure in the output pipe the flow rate through the outlet pipe and the position of the shut-off valve and metering valve can be calculated and used to control and measure the flow of a liquid such as water through the valve body.

FIG. 13 is a graph of measured flow rate against the valve positions shown in Table A. The "tell tale" amount is only a few drops per minute and thus cannot be graphed in FIG. 13.

Example 2

In this example, the prototype valve of Example 1 has been redesigned to make a more compact production valve by reducing the size of the pressure transducer, and replacing the large and somewhat cumbersome stepper motor of the prototype with its absolute encoder, with a much smaller conventional DC motor which drives through a reduction gear box and has its own integral shaft encoder mounted on the rear shaft of the motor. All of the valve body and the internal components have been machined from an engineering plastic, but the valve and its components can be injection moulded.

In addition we have reduced the size of the assembly by incorporating a paddle wheel flow meter inside the body of the valve (as shown in FIG. 14) and have mounted, a control printed circuit board (PCB) on the front of the valve as well so that the whole unit is now self contained. This PCB may contain the controller which controls the position of the electric motor and hence the opening and closing of the valve.

In this more compact valve, the rear of the valve body is shown in FIGS. 16 and 17 so they can be flush mounted against a wall. This means that the shaft, with its encoder, electric motor and gear box, as well as the pressure transducer 218 are all mounted on the front of the valve body, i.e. on the left hand side of FIG. 14, so that each of these items can be readily serviced if required.

Turning now to FIG. 14 this cross sectional view of the more compact valve body has a similar numbering configuration to that of Example 1, for example the crank pin which is numbered 131 in FIG. 3, is now numbered 231, with the other numbers incremented in a similar fashion so they start with the digit 2 rather than the digit 1. This valve of FIG. 14 has a conical metering valve member 232 with a groove on its conical surface, corresponding to the groove shown in the enlarged views of FIG. 7 and FIG. 8.

A non return valve 234 is fitted just above the inlet manifold 213. A shut-off valve 233 is situated above the crank 231, and a more compact pressure transducer 218 is fitted on the left hand side of FIG. 14, having an output cable 272 which will be connected to the control panel (not shown). Above the shut off valve 233, a flow meter 222 is situated in the valve body itself showing the paddle wheel 270. The output from the flow meter is via wires 271. The top of the valve body is an outlet connector 219.

FIGS. 15 and 16 show the placement of the printed circuit board 280. It will be apparent from FIG. 17 that this is of such a size that it can be covered by the motor housing 281, which contains the compact DC electric motor, gear box and shaft encoder.

The operation of the valve body 200, with its plumbing connectors 215 and 216 in the lower manifold 213, and its outlet connector 219, and the valve cavity plug 217 all operate in a similar fashion to the corresponding number series in Example 1.

Similarly the rotation of the crank operates in a similar fashion to that set out in FIG. 12 and in the table, and the valve actual position verse flow rate graph of FIG. 13 applies equally to the valve body of Example 2.

Example 3

This is a prototype installation intended to mimic the plumbing installation of a standard dwelling where there are a number of outlets to taps, showers, toilet systems, appliances such as dishwashers and washing machines, garden taps, and the like.

For example this standard dwelling might be a 3 bedroom home.

In this installation the dwelling is divided into two zones, each zone has a zone feed pipe designated zone 1 feed pipe 1111 and zone 2 feed pipe 1112 and each one of those feed pipes is connected to a branch leading to an outlet. For convenience each outlet is designated first by the zone and then by the outlet number. For example in zone 1 outlet 1 1113*a* may be a cold water tap in a hand basin, whilst zone 1 outlet 2 1113*b* might be the supply to a toilet cistern, whilst zone 2 outlet 1117 might be a connection to a dishwasher. Each of the zones is controlled by a respective valve unit 1115 shown in FIG. 1 and FIG. 2.

Each of these valve units 1115 is an electrically controlled valve capable of opening or closing in a selective fashion to control water flow and/or pressure within its respective zone feed pipe.

The best valve for use in this water management system is the valve described with reference to FIGS. 1 to 17, particularly the improved version of the valve of Example 2 illustrated in FIGS. 14 to 17. This is an electrically controlled valve, where the control unit has a sensor to detect the position of the crank pin and hence the opening or closing of the two valve components. By using this specially designed valve, it can be stepped through a number of different positions from fully closed to fully open, and down to an almost fully closed position in which a small water flow can be allowed, which in the specification I have called "the tell tale position". Perhaps the best way of understanding these different positions, can be understood from the table described above, and from the graph shown in FIG. 13, the angular position shown in FIG. 12.

However, the present invention is not limited to the valve of FIGS. 1 to 17, and a number of off the shelf valves or valve components could be used in conjunction with pressure and flow rate sensors to provide the necessary controls needed to conserve and manage water usage within a dwelling. Nevertheless the valve of FIGS. 1 to 17 is the most desirable and effective way of providing the necessary controls in a plumbing system, over a long period of time.

In this example, a flow meter 1121 is connected to the outlet 1122 of each valve unit, and preferably a pressure sensor is also connected to each valve unit 1115 with the signal from the flow meter and the signal from the pressure transducer being connected to a control unit 1116.

The control unit 1116 preferably contains a power supply (and battery back-up); a controller having both a display and some form of input, enabling data to be entered into the controller both for programming, and for user selection from a number of different options.

More preferably the controller 1116 has a touch screen which functions as both the display of the state of the water supply and water usage, and also provides a number of options enabling a user to select from a number of preset programmes.

The controller is in turn connected to each of the valve units 1115, so that the controller can open or close each valve unit depending upon the programme running, and the signals received from the pressure transducer and flow meter.

The controller includes a timer, to allow it to date and time stamp events, and to integrate flow rates against time to calculate the total volume of water supplied (to a zone, or to all the zones, and to compare this against defined quotas).

Turning now to FIGS. 20 and 21 the graphs show the relationship between the pressure and flow rate within a particular zone feed pipe. In FIG. 20 the top two graphs show the effect of controlling valve unit 1 and the pressure and flow rate sensed in zone 1 feed pipe. The lower pair of graphs in FIG. 20 show valve 2 in the shut off position and hence there is no measureable flow rate and no measureable pressure. In each of these graphs the display shows both the pressure in bars at any given time on a computer display as well as showing a schematic of the valve and the angle of the stepper motor controlling the valve.

The valve setting in degrees shows the instantaneous position of the valve in the upper graph. The setting of 1-2 degrees is the instant at the right hand end of the graph, where the valve is closed. So that there is no flow rate, and the pressure between the pressure transducer and the outlets from zone 1 are all closed so that water between the valve and the outlets is pressurised at 5.73 bar, and continued in FIG. 21.

Looking at the computer display, the software is configured to enable a reading of the valve position, this is an actual valve position if by controlling the stepper motor (or it could in a demonstration version be the manual control of the valve position) and the pressure and flow rates are measured from the sensors in the valves shown in FIGS. 18 and 19, their output going to the controller, and from there to a computer running the graphing software which produced the graphs in FIGS. 20 and 21.

The information at the left of the graph is the instantaneous position, and thus setting 1 to 2 shows the valve in a primal closed position corresponding to the zero flow rate at the right hand end of the flow versus time graph. At that point it will apparent that the pressure has been set at 5.73 bar. With such a pressure within the zone 1 feed pipe, and no measureable flow rate, it will be apparent that there are no leaks within this zone 1 feed pipe and the pressure is maintained as a constant with the valve closed, as shown in the tap graph of FIG. 21.

The pressure and flow graphs of FIG. 20 show that as the pressure increases the flow rate decreases and vice versa. This means it is possible to use a signal from the pressure transducer or a signal from the flow meter to provide information to the controller.

For example if a leak is detected the pressure within a zone feed pipe and its outlet branches will drop with the water in the zone feed pipe being suitably pressurised when the valve is shut off. If that pressure drops over time this provides information to the controller that there is a leak in that particular zone feed pipe. Equally if the pressure varies whilst water is flowing, or if water continues to flow through a zone feed pipe when the system expects all of the outlets to be shut off, this is an indication that there is either a leaking tap, or a tap has been left on inadvertently, or there is a leaking toilet cistern, or anyone of a number of fault conditions that needs to be remedied. The detection of these faults and how they are remedied will be explained in more detail with reference to the flow diagrams in FIGS. 22 to 27 relating to the programming of the controller.

Suggested Programmes:

FIG. 22 shows the flow limitation programme which can be run if there is a constant flow for a specified time, for example 3 minutes.

If the system is programmed to limit the water flow to a particular outlet (say a tap in a hand basin) to a maximum time of three minutes, then this flow diagram shows that the controller will sense the opening of a tap and it will start a timer, and at the end of the specified time will reduce the flow to a tell tale flow. This means that instead of the water flowing at the maximum flow rate with the tap fully opened, the tap even though still in the fully opened position will exhibit just a trickle of water. If the user is within sight of the tap and sees that the tap flow has changed, the user can signal to the controller that he wants the water flow to continue by quickly turning the tap "off and on" to cause a pressure spike, which can be sensed by the pressure transducer and provide information to the controller that the user wishes the water flow to continue (called "talk to the hand").

This "talk to the hand" concept can be used in a number of different control situations. This means that the user can override the limited time/volume restriction that may have been imposed in the programming of the controller.

This flow limitation also allows the controller to shut down the water flow to a particular outlet even though the user may have turned on a tap and hand basin and then had been called away and forgot to turn the tap off. It allows the controller to completely shut down the supply to an open tap particularly if the user has left the house and returns many hours later. The control panel can be programmed to display to the user on the user's return that a tap had been left on and that by shutting it off via the valve unit; the amount of water saved by the controller can be displayed.

Note that a particular zone, for example the zone 1 feed pipe may be connected to three outlets. They may be at different parts of the house. If one of them is the tap that has been left on, the user needs to be able to determine which is the tap at fault. On the user's return to the house (or to the controller), the system can be programmed to allow the user to request that water flows in the zone 1 feed pipe for a short period of time sufficient to enable the user to check each of the taps visually to see which one is flowing (i.e. has been left open) and then remedy the position by turning off that tap. The same applies if all of the taps have been left closed but one of them is leaking. By allowing water to flow in a particular zone feed pipe, for a predetermined time, the controller will allow the user to visually check each of the taps to see which is the one at fault.

The system also allows information on leaks in pipes (for example damage to fittings, animals such as rats puncturing plastic pipes); leaky taps, toilet cisterns that do not seal correctly and continue to waste water, and so on.

FIG. 23 shows the line test which is a subset of FIG. 22. In the line test, the valve is moved from the closed position to a test position, allowing a smaller amount of water to enter the zone feed pipe, and a pressure test carried out to sense if there is a pressure loss. If a total pressure loss is detected the controller marks that zone feed pipe as having failed, and consequently shuts down water supply to that zone feed pipe.

The controller can thus sense if it is a major failure requiring urgent attention by a plumber, or whether it is a minor failure which can be controlled by the controller for a period of time before it needs attention by a plumber.

The controller may include a communications module allowing it to communicate to a water supply authority or to a plumber or other service centre to signal what has gone wrong, and whether urgent action is needed, or whether the problem can be fixed at the next scheduled maintenance inspection.

FIG. 25 shows a self test. This programme is run if there is no flow at a scheduled time and the valve is not marked as leaking. It is a pressure test over a predetermined time, and if the pressure loss is detected the controller can calculate the leak size and mark the valve as "leaking". The output of this test is the box labelled leak prevention which is shown in more detail in FIG. 26. This programme is intended to allow a small water flow labelled "tell tale flow" to be administered by the valve, allowing a user to inspect the various taps or other outlets to see which one has a tell tale flow, and if the user needs to use that particular tap despite the fact that it has been marked as leaking, the user can send a pressure signal by opening and closing that tap, the pressure signal being detected by the pressure transducer and in turn conveyed to the controller which would allow the controller to open the tap and restore flow for a limited period of time. Thus the system allows the user to make a controlled use of a leaky tap without it having been shut off completely.

FIG. 27 shows the leak shut down programme.

Example 4

Multiple dwelling with centralised management. The schematic diagram in FIG. 28 illustrates how a multiple dwelling building (for example an apartment block or hotel) could be installed. It shows how each dwelling can have its own valves and control panel for individual control, but also since linked to a central controller which provides building wide management. The central controller can be used for alerting, aggregating statistics, water billing management and/or cost apportionment across the different dwellings, and a single communications interface to the internet.

This diagram also illustrates how the control panel can be remotely connected to the central controller via a wired or wireless connection.

By providing a connection to the internet it is possible to view the water statistics remotely, and to provide remote management of the system as needed.

Example 5

Multiple dwelling with individual management. This configuration demonstrates how multiple dwelling buildings (for example apartments in a block) could be installed, allowing each dwelling its own individual system for water management.

Each of these apartments would have its own controller having a display screen, preferably a touch screen as described elsewhere in this document. Typically the touch screen will be mounted on the wall of the dwelling, near the entrance, so that the user in entering the building can check on water usage, and check if any faults have been logged. In this configuration each of the apartments being relatively smaller set up with a single valve controlled by the controller which provides output on the touch screen.

In a commercial building (office block), or apartment/hotel or 'smart building', the system may be interfaced to a $3^{rd}$ party Building Automation System (BAS)

Where the system is connected to a BAS, the inclusion of an in-home touch screen may be optional (as the control may be via the BAS interfaces).

Similarly, in a "Smart Home", the system may be connected to a Home Automation System, and the user may interact via the automation system's existing interface.

Example 6

Single dwelling with multiple water zones. FIG. 30 shows a single dwelling having multiple water zones based around these four valves. In this case there are two pairs of two valves. It allows the system to control the various outlets and appliances.

It should be noted that this is one of many different layouts depending upon the size of the dwelling, the number of water heaters, the number of bathrooms, and shows the versatility of the invention in allowing for many different configurations. In FIG. 30 the four valves are controlled by the same controller which displays to a single display screen in the form of a touch screen shown in the diagram.

Example 7

Single dwelling using a single valve. FIG. 31 shows a simple arrangement in which only a single valve is controlled by a controller with information displayed on a touch screen. This would typically be used in a "retro fit" environment and provides the most basic level of measurement and control. It is suited to smaller dwellings, where there is only one water heater, and where water usage and control can be effected by a single valve which monitors both pressure and flow rate in the single zone controlled by the single valve.

Example 8

Single dwelling using two valves (one pair of valves). FIG. 32 shows a configuration for a simple pair of valves providing separate measurement and control of the water supply for both cold and hot water. Once again the valves are controlled by the controller, and the statistics, and control information is displayed on a touch screen. The controller can be connected to the internet, so that information about the system can be remotely accessed. In each of these configurations, it is also possible to use the interne connection to send a message to a local water authority or to a plumber if a plumber is needed to attend to any problem with the system. In particular if the system detects a leak, or other fault with the system, the controller can be configured to contact a specified plumber or technician to come and repair the system.

Example 9

FIG. 33 is a diagrammatic overview of the invention in one of its simplest installations. It shows the connection between the water utility, supplying water by the water main to a dwelling, having a number of valves controlled by the controller. Each of these items labelled "smart valves" correspond to the valves of Examples 1 or 2 described above. In this Figure, four valves are shown separating the incoming water into four different zones, one for the garden, one for the laundry, one for the bathroom or bathrooms, and one for the kitchen or kitchens. Each of the valves is controlled by a controller labelled "controller" in this drawing and the controller is connected to a display in the form of a touch screen, so that the touch screen can both display information, and provide user input to the controller.

The controller can be connected to the internet, and send information to a web application, allowing remote access and/or control of the system, and the controller can also send information to the water utility. A simple application would be recording water usage, both in terms of bulk usage, for billing purposes, but also providing usage statistics at different times, thereby allowing the water utility to send a message via the internet, or via any other suitable communication means back to the controller. For example in times of water shortage, the water utility may request the controller to limit the flow in some or all of the zones, using the peak flow requirement, or in the case of extremely severe water shortage, to limit the opening of the valves so that only a partial flow is allowed at some or all of the zones.

Some of the zones may have exterior outlets, e.g. garden taps, or garden watering systems. These may be supervised by the water utility or shut off remotely by the water utility in times of water shortage.

This diagram also provides a schematic illustration of the communication between the taps or faucets and the controller. As the valves, have provision for sensing the pressure in a particular zone, the water within the system can be used as secondary mechanism between the user at the tap or faucet and the controller. This makes use of the concept called "talk to the hand" which is described elsewhere in this document.

Although each of the valves has provision for a pressure sensor and flow control sensor, the invention envisages the inclusion of additional pressure, flow rate, temperature, or other sensors installed in the water lines, and it is envisaged that compact units could be produced which could be easily connected into the various water lines and provide information back to the controller preferably by wireless transmission of information using any one of a number of different protocols. One particular example is the inclusion of a shut off valve and temperature sensor in the shower head so that when the shower reaches the desired temperature, which can be set by the user, the water supply to that shower head can be shut off by a signal to the shut off valve. This deals with the problem of the user setting the shower control to the open position leaving the water running until it reaches the required temperature, and then forgetting that the shower has been left on. A similar and more serious consequence may well be a user turning the taps on in a bath, allowing the bath to fill, so that the hot and cold water mixes to the required temperature, then leaving the bathroom, and returning only when the bath has overflowed. By integrating information on the flow rates of the hot and cold supply against time, the controller can be programmed to fill a bath or basin only to a particular volume of liquid, and/or to sense the temperature of the water supply to the bath or other basin. The objective is to prevent the unnecessary supply and hence potential wastage of water. By controlling the flow rate and/or the total volume supplied to a particular outlet, the system can prevent overflows, or unnecessary wastage of water such as the example of the shower continually running whilst the person who wishes to use the shower is absent.

Example 10

Electronic commissioning. When the system is installed in a new dwelling or is retro fitted to an existing dwelling, it is necessary to go through a series of steps to commission the system. FIG. 34 shows the steps required to complete the electronic commissioning and check that the valve is operating.

FIG. 35 shows the steps required to commission the plumbing side of the installation. Once the electronic commissioning has been completed and the user display, the controller and the valve are all operating correctly, the plumber can then go through the steps of commissioning the plumbing component and testing that the various sensors are providing the requisite information and that the valve is opening and closing correctly to allow water to flow through the different zones.

Example 11

Maintenance procedure. FIG. 36 shows the steps required for maintenance to check the user control, controller and valve are operating correctly. In both this example and the example of the commissioning of the water management system, the operator will access a service screen, which will guide them through the various steps needed to check the system.

Example 12

Hardware/test equipment. FIG. 37 is a schematic view of the installation having two zones, showing relationship of the touch screen, the controller and the valves but also including provision for a personal computer (PC). This test equipment has been used in developing the prototypes of this invention, with the PC being used to store data from the system and provide output in the form of graphs. Some of those graphs are shown in the following drawings. Provision can be made for the controller of the controller to connect to a diagnostic PC so that statistics can be downloaded and the system checked.

Example 13

Touch screen. The controller will be provided with various programmes to provide the necessary information on the user interface, which is preferably in the form of a touch screen. It is equally possible to operate the invention using a simple display screen, and a series of buttons, or keyboard, but it is considered that a touch screen is the best means of both displaying information and allowing the user to send the necessary instructions to the valve(s). FIG. 38 shows the main screen that the users will use to access zone information. Assuming that the controller controls four valves and hence four zones, the display screen will provide a portion of its screen relating to each zone. Typically the information can be displayed in colour, to distinguish the different status of each zone. In FIG. 38 the display screen shows that zone 1 is undergoing a leak test, zone 2 displays normal activity, and in this example zone 3 and zone 4 are inactive.

An inactive signal shows that the zone has been disabled or has not been installed. A normal display shows that the zone is functioning normally. If the words "leak test" are displayed, it shows that the zone is currently performing a leak test. If the section of the display screen for that zone shows the word "leak" then the system is reporting that the last leak test has failed for that zone. If the portion of the screen related to the zone shows the word "open" then the system is reporting that the last line test failed, indicating that a tap has been left open in that zone.

By clicking on any one of those zones, the system will take the user to the zone information screen. The zone information screen is shown in FIG. 39. The zone number is prominently displayed on the screen, and the status of the zone is shown in this case by words "leak test" immediately below the zone number.

The screen now displays the current status and is colour coded accordingly. In this case it is showing flow rate, the total flow in liters per minute, the total flow in liters over the time since last reset, and the current pressure in Bar.

Of course any convenient measuring system could be used, whether metric or imperial.

In addition the following touch screen buttons are shown:
Back—allows the user to navigate back to the overview screen
Set up—navigates the zone set up screen
Reset—used to reset in the event of failed line test or leak test. It should be disabled or invisible if neither of these has occurred.
Flow rate (L/min)—the user may enter a desired flow rate here.
Close—closes the valve setting to the flow rate to 0
Flow (liters)—displays the volume of water used today and the allowed quota
Pressure—displays the current pressure.

Various other display screens can be used. In FIG. 39 there is another button called set up, which will lead the user to a zone set up screen. This displays the data needed to configure the zone. Some of this information will only be used during development, and may be removed from the users view. For example it may include:

Flow quota, partial metering angle, pulse interval, flow limitation time, leak test time (Date/Time field), line test angle.

Example 14

Graphs. The following graphs shown in FIGS. 40-42 are examples of the information that can be graphed using the PC of FIG. 37, these graphs being used for the development of the system, but useful also to understand the relationship between pressure and flow rate, and the types of information that can be detected by the controller and hence used to control the valve opening or closing. Similar graphs have been described above in relation to FIGS. 20 and 21.

It will be noted that it is possible to generate a very large number of different graphs showing the different conditions of the installation. The graphs serve to show the relationship between pressure and flow, and the relationship of these two to the valve opening or closing.

Looking at FIG. 40, the graph shows the "talk to the hand" concept. The X axis of the graph shows the time (hour:minute:second), and the different events can be described with reference to the time of the test. For example the upper line labelled A shows the angle of the valve, and the numbers on the Y axis represent in this case the valve angle ×10° thus the valve is initially in the position of valve angle 138° (represented by the number 13.8 on the Y axis). The flow rate in liters per minute is indicated by the line labelled F. The pressure is represented by the line labelled P. In graphs 40-42 the same labelling is used so that A represents valve angle; P represents pressure; and F represents flow rate.

Turning now to FIG. 40, the flow rate and pressure are generally inversely correlated as can be seen from FIG. 40 although not exactly inversely proportional to one another. As the user opens and closes the tap, a rise and fall in pressure can be seen, as indicated by the bumps at 13:44:10 and 13:44:30. The next positive edge at 13:44:45 causes the valve angle (line A) to drop to 100° allowing a large rise in flow. A short while later the system reduces the flow, and this draws the valve angle back to 138°.

Note that the angles shown in this graph can be correlated to the valve angles shown in relation to table A and the valve position.

By detecting pressure chambers, and in particular by looking for regular changes in pressure, as can be invoked by the user rapidly turning a faucet on or off, the pressure spikes can be used to signal to the controller that the user requires the controller to open or close the valve in a particular way.

FIG. 41 shows leak detection. In this case a gradual decline in pressure in line P triggers the leak detection programme. Noting that the controller continuously monitors the pressure in the zone, a change in pressure even if a gradual change is shown in FIG. 41, can be detected and the necessary steps taken. At 09:32:00 the valves' angle (line A) moves from 137° (normal flow) to 0° (the closed position). This graphs shows that the valve remains closed for the next 30 seconds while the system checks the pressure loss. Having detected a leak, the system displays the word "leak" on the display panel. At 09:32:30 the leak having been detected and displayed on the display panel, the user presses the reset button. The valve now moves to 160° (metering position) to allow a trickle of water through the tap and the screen indicates to the user to open the tap. A flow is now detected on line F, and the systems reopens the tap returning the valve angle to 137°.

FIG. 42 shows a graph in response to the flow limitation programme. In this case a continuous flow exceeds the amount allowed by the flow limitation programme. At 11:12:15 the valve's angle (line A) moves from 138° (normal flow) to 160° (metering). The flow is reduced to a trickle indicating to the user that they should close the tap. At 11:12:20 the user closes the tap causing a rise in pressure (line P). This signals to the system to restore the normal flow and the valve angle adjusts back to 138°.

Flow continues and at 11:14:20 the system again moves the valve to the metering position. However, in this case the user does not close the tap, and at 11:14:50 the system moves the valve angle to 0° shutting off the flow. At 11:15:15 the user presses the reset button and the system checks that the tap is closed. The valve moves to the 25° position but does not see a significant rise in pressure, indicating to the controller that the user has not closed the tap. The valve moves back to the closed position. At 11:30:30 the user again presses the reset button but this time has closed the tap. A significant rise in pressure is seen by the system, and the valve moves back to 138° allowing normal flow of water.

Example 15

Instant warm water. Although not illustrated in any of the drawings, the invention can make use of the "soft start" feature to provide instant warm water at a point of use such as hand basin. One of the problems with a domestic or commercial water installation is that the hot and cold pipes are plumbed separately, and that in order to supply warm water to a hand basin, the hot and cold water has to be mixed together. In a hotel or other area where a considerable amount of use of the particular hand basin takes place, the water in the supply line may remain hot or sufficiently warm so that when the tap is turned on the user experiences a quick supply of warm water. But in most residential dwellings this is not the case. The dormant hot water in the supply line will have cooled off. This means that the tap needs to be run for a considerable period of time before sufficient hot water reaches the tap that it can be mixed with cold water to reach the required temperature. Washing hands requires water of around 40° C., and most health departments require that hands be washed for a minimum of 20 seconds under warm water. To do this, involves wastage of a considerable amount of water until the water at the required outlet reaches the desired temperature.

In order to alleviate or minimise this wastage of water, the plumbing installation can be modified so that a small tank of water with a built in electric heater can be installed at or adjacent the outlet, and plumbed in such a way that it can be connected to the cold water supply, with a built in diverter valve, so that when the cold tap or faucet is turned on the electrically controlled valve for that zone will be programmed to enter the soft start mode for a period of 20 seconds before full flow is allowed to that tap or faucet. In that first 20 seconds, the allowed flow rate in that supply line is insufficient to raise a weighted diverter valve, so that water flows around the diverter valve into the small warm water tank. Preferably the small warm water tank is maintained at 40° C., so that the cold water entering the hot water tank will flush the warm water from the tank out to the faucet, thereby giving the user a minimum of 20 seconds of warm water from the cold water faucet. At the end of the 20 seconds or other required time, this being determined and pre-programmed in the system, or modified by the user at the control panel, and dependent also on the volume of water in the warm water tank under or adjacent the faucet, the system will open the electrically controlled valve to allow full flow to that faucet. At this point the flow rate will be sufficiently high that it will push the weight of the diverter valve upwardly against its seat, allowing the cold water inlet to the warm water tank to be closed, and the cold water flow to bypass the warm water tank and go directly to the faucet. The user will then experience a sudden increase in flow, and the water to the faucet will now run cold. This will usually be a sufficient change in temperature to alert the user to the fact that their limited time of say 20 seconds has been used up and that they should close off the faucet.

Thus the combination of the soft start and the provision of a warm water tank with a flow control diverter valve provide sufficient instant warm water for the user to wash their hands, and also provide information to the user to turn off the faucet at the end of that period.

Of course the user may need to use the cold water supply for some other purpose. The controller can be set to monitor the usage at that faucet and if the total flow to that faucet exceeds a predetermined value, a signal can be sent to the user by for example turning the valve on or off a number of times so that the user experiences an intermittent supply of water, without the flow rate changing significantly enough to re-establish the flow of warm water.

ADVANTAGES OF THE PREFERRED EMBODIMENTS

The controller of this invention in conjunction with the valves and sensors enables a plumbing installation for say a dwelling to control the water supply in one or more zones, to thereby minimise unnecessary water usage or water loss, and to enable the user (or the water supply authority) to control water usage at particular times, or by volume, or by pressure or flow rate.

It is envisaged that the full scale application of this invention to dwellings will result in significant nationwide water savings. Potable water is a precious commodity, and by monitoring the water usage, and by responding to pressure drops, or changes in flow rate, or by controlling the total amount of water supplied to a particular zone, or the total water supplied to all zones, the amount of water usage can be carefully controlled and regulated.

Examples of this include limiting the water usage in watering plants by allowing watering to take place but only at a very low flow rate, or by controlling the water supply for say washing a car, by limiting the water supply in that zone to say six liters per minute, but allowing the user to signal to the controller to allow a much higher flow rate for a short period of time to rinse off the car. For example it is envisaged that by squeezing the trigger of the spray nozzle three times this will send a characteristic pressure spike through the particular zone outlet pipe back to the pressure transducer which in turn can signal to the controller that a particular request has been received from the user, and if so programmed the controller could then increase the flow in that branch to say twenty liters per minute for two minutes to allow the user to fully rinse off the vehicle. At the end of that time the water flow rate may be reduced again to the normal maximum of six liters per minute.

In another example the controller may be preset to allow a shower exclusive use of the flow and pressure, at the expense of appliances, but only at a preset time, for example between 7:00 am and 7:30 am, or conversely the parents may limit the total flow of water allowed by a particular shower thereby minimising the duration of the shower by a teenager or other member of the household.

A secondary benefit of this invention is that it can also detect leaks and thus assist in conserving water by shutting off the water supply By monitoring the pressure and flow rate in particular zones, and storing this information in the controller, it is possible to educate the user, and show where they have exceeded a predetermined quota of water usage. By storing this information in digital format, keeping logs of usage on a daily, weekly, monthly basis, and by transmitting this information to a water utility, or other remote site, it is possible to provide better control of water usage in a group of dwellings, or across a city, and to manage water demand at different times.

Moreover by being able to transmit information from the controller to a remote site, it is possible to allow a householder to control water consumption in their dwelling even when absent. By linking this to a web application, a user can monitor their water usage over the interne. If for example they have left their home for a considerable period of time, but have forgotten to turn off the water supply, they can shut down the water supply in one or more zones, by sending a signal over the internet to the controller.

Although the internet is the preferred means of communication, other means of communication can be used including the telephone system, or by wireless transmission means or the like.

A particularly advantageous feature of the invention is the fact that by sending information from the controller to a remote site, the controller can be set up so that if abnormal water usage is detected, for example by detecting a leak, it can send a signal to a preferred plumber, so that the plumber can check the installation, determine the severity of the leak, and take remedial action. In most cases a leaky faucet will need to be fixed, but would not be regarded as an emergency, as although significant water loss will occur over time, the system can take remedial action itself by cutting off supply to a zone if a leak is detected.

However a burst pipe is detected, the system can shut off water supply to that zone, and send an immediate signal to the selected plumber to come and attend to the emergency.

VARIATIONS

In the drawings relating to Example 3, only 2 zones have been illustrated for a typical 3 bedroom household, but it will be apparent that a small dwelling may only have 1 zone and 1 valve, whilst larger dwellings may have 3 or 4 or more zones, depending upon the layout of the dwelling, the number of outlets or appliances, and the need to provide more precise control in a number of different zones.

Whilst the preferred form of the invention makes use of a pressure sensor and a flow rate sensor in the valve itself, it will be appreciated that these various sensors can be positioned at different points around the plumbing installation, and it is envisaged that a number of different sensors can be installed in different lines or close to different points of use, to detect pressure and/or flow rate and/or temperature, and to provide the appropriate signals back to the controller. The most preferred form of this would be to make use of a short range wireless transmission protocol, such as Bluetooth, or other wireless protocol that would enable coded signals to be transmitted back to the controller, so the controller could build up a picture of the water flow and water pressure at different points within the installation. Temperature information is also useful particularly at outlets where the hot and cold water has to be mixed to provide a warm water flow, and such information is useful in enabling the controller to maintain a constant flow of hot or cold water to a particular outlet, to minimise temperature fluctuations, for example temperature fluctuations in a shower. This is particularly so where the system may wish to reduce the flow to that shower if the quota of available water has been exceeded, or where the system is programmed to send a temperature signal to the user of the shower so that in the concept of follow me where the flow rate to the shower is maintained at the expense of other outlets, it may still be desirable to rapidly change the temperature of the shower to give the user a "wake up call" that they have exceeded their allowable quota.

Thus it will be appreciated that the combination of the controller and the electrically controlled valve, with its appropriate sensors, can provide a wide range of different control sequences, and can assist in managing and conserving water at points of use within a dwelling or commercial building.

A reference has been made to the valve of my co-pending application, but it will be apparent that commercially available valves, for example any position controlled valve such as a stepper motor control valve capable of precise control of the flow rate may be used in place of my preferred valve.

Finally various other alterations or modifications made be made to the foregoing without departing from the spirit and scope of this invention.

The invention claimed is:

1. A water management system adapted for use with a supply line from a water source to a point of use, the system comprising:
    at least one electrically operated valve located in the supply line, each said electrically operated valve having a water inlet and a water outlet to a zone controlled by the electrically operated valve, said zone having one or more points of use, each said electrically operated valve having a shut-off valve member and a metering valve member, the metering valve member having at least one bypass passageway in a form of tell-tale groove to enable a water flow through the metering valve member when the metering valve member is in a fully closed position, and each said valve is capable of allowing a number of different flow rates from a fully shut off position to fully open position including also a sensing position with a minimal flow rate;
    each electrically operated valve having a pressure sensor located in the electrically operated valve or downstream of the electrically operated valve outlet to detect pressure of the water in the zone supplied by the valve;
    each electrically operated valve having a flow sensor located in the electrically operated valve or downstream of the electrically operated valve outlet to measure a flow rate of water flowing in the zone supplied by the electrically operated valve;
    a controller interfaced to at least one of said pressure sensors, at least one of said flow sensors and at least one of said electrically operated valves, the controller being operative to terminate or change the flow of water to a zone or point of use in the event that
    (a) the flow rate exceeds a maximum allowed value, or
    (b) total flow exceeds a maximum allowed quota, or
    (c) a pressure change is detected in the supply line.

2. The water management system as claimed in claim 1, wherein the controller has a display screen and user operated controls to enable the user to monitor water usage and/or to change usage parameters.

3. The water management system as claimed in claim 1, wherein the shut off valve member and the metering valve member are controlled by the rotational position of an electric motor.

4. The water management system as claimed in claim 3, wherein the controller is programmed to control the electrically operated valve to allow a soft start in which the electrically operated valve is opened to allow an initial water flow less than a demand flow at the point of use.

5. The water management system as claimed in claim 3, wherein the controller records water usage per zone and reports usage and any faults on its display screen.

6. The water management system as claimed in claim 5, wherein the controller reports water usage and any faults to a remote site.

7. The plumbing installation as claimed in claim 6, wherein the controller has a number of preset programs capable of operating self tests on the plumbing installation, at least one of which programs can detect if a tap or faucet has been left in the open position and if so can close the adjustable valve to prevent wastage of water.

8. The plumbing installation as claimed in claim 7, wherein one of which programs can detect a leak at one or more points within the water feed pipe and/or branches thereof.

9. The water management system as claimed in claim 1, wherein the metering valve member has two tell tale grooves that are 180° apart.

10. The water management system as claimed in claim 1, wherein the electrically operated valve includes a valve body connected to an electric motor and a shaft encoder, such that the electric motor causes a crank pin to rotate, and the crank pin passes through a center of the valve body at right angles to a main rectangular axis of the valve body.

11. The water management system as claimed in claim 10, wherein at a bottom of the valve body there is an intake manifold with connectors configured to enable a number of valve bodies to be connected together to a common inlet pipe.

12. The water management system as claimed in claim 10, wherein the electric motor is an electric stepper motor configured to cause a shaft of the electric motor to rotate on command.

13. The water management system as claimed in claim 10, wherein the shaft of the electric motor is connected to a crank pin, and the crank pin is held within a hollow keeper which in turn is connected both to the shut-off valve member and also to the metering valve member.

14. The water management system as claimed in claim 1, wherein the metering valve member has a form of a conical body capable of moving into or out of engagement with a throat, and when fully lowered tapered sides of the metering valve member will mate against tapered sides of an upper portion of the throat to cause the metering valve member to close off water flow through the throat.

15. The water management system as claimed in claim 1, wherein there are a plurality of tell-tale grooves.

16. A plumbing installation, comprising:
a water inlet connected or connectable to a mains water supply,
an adjustable valve connected between the water inlet, and
a water feed pipe leading to different outlets selected from the group consisting of taps, showers, toilets and appliances, the water feed pipe being connected to a number of branches, servicing one or more of the outlets, wherein
each said adjustable valve has a shut-off valve member and a metering valve member, the metering valve member having at least one bypass passageway in a form of a tell-tale groove to enable a water flow through the metering valve member when the metering valve member is in a fully closed position,
a pressure sensor and a flow sensor are connected to the adjustable valve or to the water feed pipe or any branches thereof to sense the pressure and/or water flow and/or volume consumed within the water feed pipe, and wherein a controller having a display and input means, is operatively connected to the adjustable valve to control the operation of the adjustable valve in response to signals from the pressure sensor and/or the flow sensor, and in response to programs controlling the pressure or flow within the water feed pipe or branches thereof.

17. The plumbing installation as claimed in claim 16, wherein the metering valve member has two tell tale grooves that are 180° apart.

18. The plumbing installation as claimed in claim 16, wherein the adjustable valve is an electrically operated valve including a valve body connected to an electric motor and a shaft encoder, such that the electric motor causes a crank pin to rotate, and the crank pin passes through a center of the valve body at right angles to a main rectangular axis of the valve body.

19. The plumbing installation as claimed in claim 18, wherein at a bottom of the valve body there is an intake manifold with connectors configured to enable a number of valve bodies to be connected together to a common inlet pipe.

20. The plumbing installation as claimed in claim 18, wherein the electric motor is an electric stepper motor configured to cause a shaft of the electric motor to rotate on command.

* * * * *

UNITED STATES PATENT AND TRADEMARK OFFICE
CERTIFICATE OF CORRECTION

| | | |
|---|---|---|
| PATENT NO. | : 8,606,413 B2 | Page 1 of 1 |
| APPLICATION NO. | : 13/121836 | |
| DATED | : December 10, 2013 | |
| INVENTOR(S) | : David John Picton | |

It is certified that error appears in the above-identified patent and that said Letters Patent is hereby corrected as shown below:

In the Claims

In column 25, line 16,

"claim 6"

should be replaced with

--claim 16--.

Signed and Sealed this
Fourteenth Day of October, 2014

Michelle K. Lee
*Deputy Director of the United States Patent and Trademark Office*

UNITED STATES PATENT AND TRADEMARK OFFICE
CERTIFICATE OF CORRECTION

PATENT NO.        : 8,606,413 B2                                    Page 1 of 1
APPLICATION NO.   : 13/121836
DATED             : December 10, 2013
INVENTOR(S)       : David John Picton It is certified that error appears in the above-identified patent and that said Letters Patent is hereby corrected as shown below:

This certificate supersedes the Certificate of Correction issued October 14, 2014. The certificate is vacated since an allowed claim cannot not depend on a higher named claim. The Claim 7 is reinstated as set forth in printed patent: delete "Column 25, line 16, claim 16" and insert -- Column 25, line 16, claim 6 --.

Signed and Sealed this
Twenty-third Day of December, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 8,606,413 B2
APPLICATION NO. : 13/121836
DATED : December 10, 2013
INVENTOR(S) : David John Picton It is certified that error appears in the above-identified patent and that said Letters Patent is hereby corrected as shown below:

In the Claims:

Column 25, line 16, cancel the text beginning with "The plumbing installation as claimed in claim 6," to and ending with "and/or branches thereof." in column 25, line 24.

Column 25, line 25, replace
"9. The water management system as claimed in claim 1," with
--7. The water management system as claimed in claim 1,--.

Column 25, line 28, replace
"10. The water management system as claimed in claim 1," with
--8. The water management system as claimed in claim 1,--.

Column 25, line 34, replace
"11. The water management system as claimed in claim 10," with
--9. The water management system as claimed in claim 8,--.

Column 25, line 38, replace
"12. The water management system as claimed in claim 10," with
--10. The water management system as claimed in claim 8,--.

Column 25, line 42, replace
"13. The water management system as claimed in claim 10," with
--11. The water management system as claimed in claim 8,--.

Column 25, line 47, replace
"14. The water management system as claimed in claim 1," with
--12. The water management system as claimed in claim 1,--.

Signed and Sealed this
Fourth Day of August, 2015

Michelle K. Lee
*Director of the United States Patent and Trademark Office*

Column 26, line 4, replace
"15. The water management system as claimed in claim 1," with
--13. The water management system as claimed in claim 1,--.

Column 26, line 6, replace
"16. A plumbing installation, comprising:" with
--14. A plumbing installation, comprising--.

Column 26, line 31, replace
"17. The plumbing installation as claimed in claim 16," with
--15. The plumbing installation as claimed in claim 14,--.

Column 26, line 34, replace
"18. The plumbing installation as claimed in claim 16," with
--16. The plumbing installation as claimed in claim 14,--.

Column 26, line 41, replace
"19. The plumbing installation as claimed in claim 18," with
--17. The plumbing installation as claimed in claim 16,--.

Column 26, line 45, replace
"20. The plumbing installation as claimed in claim 18," with
--18. The plumbing installation as claimed in claim 16,--.

In column 26, after line 48, insert the following:
--19. The plumbing installation as claimed in claim 14, wherein the controller has a number of preset programs capable of operating self tests on the plumbing installation, at least one of which programs can detect if a tap or faucet has been left in the open position and if so can close the adjustable valve to prevent wastage of water.
20. The plumbing installation as claimed in claim 19, wherein one of which programs can detect a leak at one or more points within the water feed pipe and/or branches thereof.--.